US009855620B2

(12) United States Patent
Kooken et al.

(10) Patent No.: US 9,855,620 B2
(45) Date of Patent: Jan. 2, 2018

(54) WELDING SYSTEM AND METHOD OF WELDING

(71) Applicant: LINCOLN GLOBAL, INC., City of Industry, CA (US)

(72) Inventors: Todd E. Kooken, Solon, OH (US); Lifeng Luo, Solon, OH (US); Matthew Krueger, Medina, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 336 days.

(21) Appl. No.: 14/505,368

(22) Filed: Oct. 2, 2014

(65) Prior Publication Data

US 2015/0014290 A1    Jan. 15, 2015

Related U.S. Application Data

(63) Continuation-in-part of application No. 11/051,196, filed on Feb. 7, 2005.

(51) Int. Cl.
*B23K 9/10* (2006.01)
*B23K 9/09* (2006.01)
*B23K 9/173* (2006.01)

(52) U.S. Cl.
CPC .............. *B23K 9/1075* (2013.01); *B23K 9/09* (2013.01); *B23K 9/091* (2013.01); *B23K 9/093* (2013.01); *B23K 9/1043* (2013.01); *B23K 9/173* (2013.01)

(58) Field of Classification Search
CPC ........... B23K 9/00; B23K 9/06–9/0671; B23K 9/073–9/0737; B23K 9/09–9/093;
(Continued)

(56) References Cited

U.S. PATENT DOCUMENTS 3,459,920 A    8/1969   Sevenco
3,737,755 A    6/1973   Calkin
(Continued)

FOREIGN PATENT DOCUMENTS

AU    2005237177 A1    10/2006
AU    2007200934 A1     5/2008
(Continued)

OTHER PUBLICATIONS

U.S. Appl. No. 11/102,429, filed Apr. 8, 2005, Chopper Output Stage for Arc Welder Power Source.
(Continued)

*Primary Examiner* — Sang Y Paik
(74) *Attorney, Agent, or Firm* — Perkins Coie LLP

(57) ABSTRACT

A three stage power source for an electric arc welding process comprising an input stage having an AC input and a first DC output signal; a second stage in the form of an unregulated DC to DC converter having an input connected to the first DC output signal and converts the first DC output signal to a second DC output signal of the second stage; and a third stage to convert the second DC output signal to a welding output for welding wherein the input stage and the second stage are assembled into a first module within a first housing structure and the third stage is assembled into a second module having a separate housing structure connectable to the first module with long power cables. The second module also includes wire feeding systems and electronics.

18 Claims, 24 Drawing Sheets

(58) Field of Classification Search
CPC .......... B23K 9/1006–9/1037; B23K 9/1043–9/1075; B23K 9/1081; B23K 9/173
USPC ........ 219/130.1–130.51, 136, 137 R, 137 PS
See application file for complete search history.

(56) References Cited

U.S. PATENT DOCUMENTS

| | | | |
|---|---|---|---|
| 3,809,853 A | 5/1974 | Manz | |
| 3,904,846 A | 9/1975 | Risberg | |
| 3,984,799 A | 10/1976 | Fletcher et al. | |
| 4,020,320 A | 4/1977 | Pijls et al. | |
| 4,020,361 A | 4/1977 | Suelzle et al. | |
| 4,049,946 A | 9/1977 | Fluckiger et al. | |
| 4,125,759 A | 11/1978 | Kiyohara et al. | |
| 4,201,906 A | 5/1980 | Puschner | |
| 4,225,769 A * | 9/1980 | Wilkins | H05H 1/36 219/121.36 |
| 4,245,285 A | 1/1981 | Weiss | |
| 4,403,269 A | 9/1983 | Carroll | |
| 4,409,465 A | 10/1983 | Yamamoto et al. | |
| 4,417,197 A * | 11/1983 | Schwarz | H02M 3/1584 323/272 |
| 4,425,613 A | 1/1984 | Shelly | |
| 4,433,370 A | 2/1984 | Karadsheh et al. | |
| 4,442,339 A | 4/1984 | Mizuno et al. | |
| 4,442,370 A | 4/1984 | Veyssiere | |
| 4,447,695 A | 5/1984 | Inoue | |
| 4,485,293 A | 11/1984 | Tabata et al. | |
| 4,494,180 A | 1/1985 | Streater et al. | |
| 4,503,316 A | 3/1985 | Murase et al. | |
| 4,518,844 A | 5/1985 | Needham | |
| 4,521,671 A | 6/1985 | Fronius | |
| 4,521,672 A | 6/1985 | Fronius | |
| 4,533,986 A | 8/1985 | Jones | |
| 4,540,892 A | 9/1985 | Carvalho | |
| 4,546,234 A | 10/1985 | Ogasawara et al. | |
| 4,564,742 A | 1/1986 | Karlsson | |
| 4,618,919 A | 10/1986 | Martin, Jr. | |
| 4,635,181 A | 1/1987 | Bourgeault | |
| 4,677,366 A | 6/1987 | Wilkinson et al. | |
| 4,677,667 A | 6/1987 | Burns | |
| 4,720,667 A | 1/1988 | Lee et al. | |
| 4,720,668 A | 1/1988 | Lee et al. | |
| 4,748,397 A | 5/1988 | Ogawa et al. | |
| 4,779,184 A | 10/1988 | White | |
| 4,855,888 A | 8/1989 | Henze et al. | |
| 4,857,822 A | 8/1989 | Tabisz et al. | |
| 4,864,479 A | 9/1989 | Steigerwald et al. | |
| 4,866,247 A | 9/1989 | Parks | |
| 4,889,969 A | 12/1989 | Kawai et al. | |
| 4,904,843 A | 2/1990 | Hori et al. | |
| 4,924,170 A | 5/1990 | Henze | |
| 4,963,715 A | 10/1990 | Tuttle | |
| 4,964,026 A | 10/1990 | Locascio | |
| 5,001,326 A | 3/1991 | Stava | |
| 5,001,623 A | 3/1991 | Magid | |
| 5,008,795 A | 4/1991 | Parsley et al. | |
| 5,019,952 A | 5/1991 | Smolenski et al. | |
| 5,066,900 A | 11/1991 | Bassett | |
| 5,113,337 A | 5/1992 | Steigerwald | |
| 5,130,561 A | 7/1992 | Elliott et al. | |
| 5,149,933 A | 9/1992 | Donner | |
| 5,172,309 A | 12/1992 | DeDoncker et al. | |
| 5,220,151 A | 6/1993 | Terayama et al. | |
| 5,225,660 A | 7/1993 | Mita et al. | |
| 5,235,504 A | 8/1993 | Sood | |
| 5,245,525 A | 9/1993 | Galloway et al. | |
| 5,272,313 A | 12/1993 | Karino et al. | |
| 5,278,390 A | 1/1994 | Blankenship | |
| 5,319,533 A | 6/1994 | Reynolds et al. | |
| 5,321,348 A | 6/1994 | Vinciarelli et al. | |
| 5,343,017 A | 8/1994 | Karino et al. | |
| 5,343,140 A | 8/1994 | Gegner | |
| 5,349,149 A | 9/1994 | Shiraki et al. | |
| 5,349,157 A | 9/1994 | Blankenship | |
| 5,349,159 A | 9/1994 | Mita et al. | |
| 5,351,175 A | 9/1994 | Blankenship | |
| 5,367,448 A | 11/1994 | Carroll | |
| 5,402,060 A | 3/1995 | Erisman | |
| 5,406,051 A | 4/1995 | Lai | |
| 5,414,238 A | 5/1995 | Steigerwald et al. | |
| 5,414,613 A | 5/1995 | Chen | |
| 5,418,704 A | 5/1995 | Hua et al. | |
| 5,434,768 A | 7/1995 | Jitaru et al. | |
| 5,440,179 A | 8/1995 | Severinsky | |
| 5,444,356 A | 8/1995 | Reynolds et al. | |
| 5,465,011 A | 11/1995 | Miller et al. | |
| 5,477,131 A | 12/1995 | Gegner | |
| 5,543,704 A | 8/1996 | Thoren | |
| 5,601,741 A | 2/1997 | Thommes | |
| 5,612,609 A | 3/1997 | Choi | |
| 5,615,095 A | 3/1997 | Reynolds et al. | |
| 5,615,098 A | 3/1997 | Ishii et al. | |
| 5,636,114 A | 6/1997 | Bhagwat et al. | |
| 5,710,696 A | 1/1998 | Reynolds et al. | |
| 5,715,150 A | 2/1998 | Stava | |
| 5,747,972 A | 5/1998 | Baretich et al. | |
| 5,760,372 A | 6/1998 | Karino et al. | |
| 5,771,163 A | 6/1998 | Moriguchi et al. | |
| 5,777,860 A | 7/1998 | Halbert | |
| 5,786,992 A | 7/1998 | Vinciarelli et al. | |
| 5,790,389 A | 8/1998 | Hua | |
| 5,796,595 A | 8/1998 | Cross | |
| 5,811,757 A | 9/1998 | Higgins | |
| 5,824,990 A | 10/1998 | Geissler et al. | |
| 5,825,642 A | 10/1998 | Ishii et al. | |
| 5,831,240 A | 11/1998 | Katooka et al. | |
| 5,847,942 A | 12/1998 | Bazinet et al. | |
| 5,864,116 A | 1/1999 | Baker | |
| 5,867,374 A | 2/1999 | Moreau | |
| 5,874,826 A | 2/1999 | Chen et al. | |
| 5,875,104 A | 2/1999 | Prager | |
| 5,894,414 A | 4/1999 | Jiang | |
| 5,917,711 A | 6/1999 | Shikata et al. | |
| 5,926,381 A | 7/1999 | Moriguchi et al. | |
| 5,990,445 A | 11/1999 | Ogasawara et al. | |
| 5,991,169 A | 11/1999 | Kooken | |
| 5,991,180 A | 11/1999 | Vogel et al. | |
| 6,023,037 A | 2/2000 | Church et al. | |
| 6,023,154 A | 2/2000 | Martinez | |
| 6,023,416 A | 2/2000 | Shikata et al. | |
| 6,031,737 A | 2/2000 | Green | |
| 6,051,804 A | 4/2000 | Reynolds et al. | |
| 6,051,806 A | 4/2000 | Shikata et al. | |
| 6,054,674 A | 4/2000 | Moriguchi et al. | |
| 6,055,161 A | 4/2000 | Church et al. | |
| 6,067,241 A | 5/2000 | Lu | |
| 6,069,801 A | 5/2000 | Hodge, Jr. et al. | |
| 6,069,811 A | 5/2000 | Moriguchi et al. | |
| 6,087,628 A | 7/2000 | Ferkel et al. | |
| 6,091,612 A | 7/2000 | Blankenship | |
| 6,101,105 A | 8/2000 | Gilmore | |
| 6,115,273 A | 9/2000 | Geissler | |
| 6,177,645 B1 | 1/2001 | Church et al. | |
| 6,188,585 B1 | 2/2001 | Ikeda et al. | |
| 6,198,642 B1 | 3/2001 | Kociecki | |
| 6,207,927 B1 | 3/2001 | Mita et al. | |
| 6,207,929 B1 | 3/2001 | Stava | |
| 6,211,657 B1 | 4/2001 | Goluszek | |
| 6,236,014 B1 | 5/2001 | Ulrich | |
| 6,268,587 B1 | 7/2001 | Kooken et al. | |
| 6,278,080 B1 | 8/2001 | Moriguchi et al. | |
| 6,291,798 B1 | 9/2001 | Stava | |
| 6,300,589 B1 | 10/2001 | Reynolds et al. | |
| 6,329,636 B1 | 12/2001 | Geissler | |
| 6,331,694 B1 | 12/2001 | Blankenship | |
| 6,349,044 B1 | 2/2002 | Canales-Abarca et al. | |
| 6,353,547 B1 | 3/2002 | Jang et al. | |
| 6,365,874 B1 | 4/2002 | Stava | |
| 6,366,476 B1 | 4/2002 | Yasumura | |
| 6,384,373 B1 | 5/2002 | Schwartz | |
| 6,469,921 B2 | 10/2002 | Arai et al. | |
| 6,472,634 B1 | 10/2002 | Houston | |
| 6,483,687 B2 | 11/2002 | Katooka et al. | |

(56) References Cited

U.S. PATENT DOCUMENTS

| | | | |
|---|---|---|---|
| 6,501,049 B2 | 12/2002 | Stava | |
| 6,504,132 B1 | 1/2003 | Church | |
| 6,570,128 B1 | 5/2003 | Mela | |
| 6,570,129 B1* | 5/2003 | Samodell | B23K 9/1043 219/130.21 |
| 6,570,130 B1 | 5/2003 | Kooken et al. | |
| 6,570,132 B1* | 5/2003 | Brunner | B23K 9/1087 219/132 |
| 6,600,134 B2 | 7/2003 | Stava | |
| 6,618,274 B2 | 9/2003 | Boylan et al. | |
| 6,653,595 B2 | 11/2003 | Hutchison et al. | |
| 6,660,966 B2 | 12/2003 | Houston et al. | |
| 6,665,183 B1 | 12/2003 | Shikata et al. | |
| 6,683,278 B2 | 1/2004 | Stava et al. | |
| 6,710,299 B2 | 3/2004 | Blankenship et al. | |
| 6,713,721 B2 | 3/2004 | Albrecht | |
| 6,717,107 B1 | 4/2004 | Hsu | |
| 6,723,957 B2 | 4/2004 | Holverson | |
| 6,750,637 B2 | 6/2004 | Nagaki et al. | |
| 6,815,639 B2 | 11/2004 | Geissler | |
| 6,864,479 B1 | 3/2005 | Davis et al. | |
| 7,022,935 B1* | 4/2006 | Matus | B23K 10/00 219/121.39 |
| 7,274,000 B2 | 9/2007 | Dodge et al. | |
| 8,269,141 B2 | 9/2012 | Daniel et al. | |
| 8,581,147 B2 | 11/2013 | Kooken et al. | |
| 8,785,816 B2 | 7/2014 | Kooken et al. | |
| 2002/0125235 A1 | 9/2002 | Stava | |
| 2002/0191425 A1 | 12/2002 | Geissler | |
| 2003/0111451 A1 | 6/2003 | Blankenship et al. | |
| 2003/0183609 A1 | 10/2003 | Holverson et al. | |
| 2004/0206736 A1 | 10/2004 | Nishikawa et al. | |
| 2005/0051196 A1 | 3/2005 | Kao et al. | |
| 2006/0011595 A1 | 1/2006 | Daniel et al. | |
| 2006/0086706 A1* | 4/2006 | Ulrich | B23K 9/1087 219/132 |
| 2006/0175313 A1 | 8/2006 | Kooken et al. | |
| 2006/0213890 A1 | 9/2006 | Kooken et al. | |
| 2006/0226130 A1 | 10/2006 | Kooken et al. | |
| 2006/0243716 A1 | 11/2006 | Stava et al. | |
| 2007/0051712 A1 | 3/2007 | Kooken et al. | |

FOREIGN PATENT DOCUMENTS

| | | |
|---|---|---|
| AU | 2006200513 C1 | 9/2008 |
| BR | PI 0505514-8 A | 10/2006 |
| BR | PI 0505417-6 A | 12/2006 |
| CA | 2518125 A1 | 9/2006 |
| CA | 2527747 C | 4/2013 |
| CN | 1064178 A | 9/1992 |
| CN | 1324141 A | 11/2001 |
| CN | 1838517 A | 9/2006 |
| CN | 101168210 A | 4/2008 |
| CN | 100464922 C | 3/2009 |
| CN | 100537107 C | 9/2009 |
| CN | 101941111 A | 1/2011 |
| EP | 0670623 A2 | 9/1995 |
| EP | 0704957 A2 | 4/1996 |
| EP | 1615654 A2 | 1/2006 |
| EP | 1616654 A1 | 1/2006 |
| EP | 1688203 A2 | 8/2006 |
| EP | 1704854 A1 | 9/2006 |
| EP | 1704954 A1 | 9/2006 |
| EP | 1916047 A1 | 4/2008 |
| EP | 1710897 B1 | 8/2010 |
| EP | 1688203 B1 | 8/2011 |
| GB | 2320627 A | 6/1998 |
| JP | 45-35273 A | 11/1970 |
| JP | 58-112657 A | 7/1983 |
| JP | 58-132368 A | 8/1983 |
| JP | 61-296965 A | 12/1986 |
| JP | 1-143767 A | 6/1989 |
| JP | 2-41777 A | 2/1990 |
| JP | 3-4376 A | 1/1991 |
| JP | 4-105552 A | 4/1992 |
| JP | 4-303714 A | 10/1992 |
| JP | 8-308219 A | 11/1996 |
| JP | 9-271940 A | 10/1997 |
| JP | 11-123552 A | 5/1999 |
| JP | 11-235040 A | 8/1999 |
| JP | 3004376 B2 | 1/2000 |
| JP | 2000-173794 A | 6/2000 |
| JP | 2006-223092 A | 8/2006 |
| JP | 4762600 B2 | 8/2011 |
| KR | 10-2006-0090162 A | 8/2006 |
| KR | 10-0671379 B1 | 1/2007 |
| KR | 10-0675117 B1 | 1/2007 |
| MX | PA05011461 A | 9/2006 |
| MX | PA06001461 A | 9/2006 |
| MX | 265521 B | 3/2009 |
| PL | 1688203 T3 | 1/2012 |
| TW | I309912 B | 5/2009 |
| TW | I314490 B | 9/2009 |
| TW | I320627 B | 2/2010 |
| WO | WO 03/015973 A1 | 2/2003 |

OTHER PUBLICATIONS

U.S. Appl. No. 13/572,354, filed Aug. 10, 2012, Power Source for Electric Arc Welding.

U.S. Appl. No. 11/051,196, filed Feb. 7, 2005, Modular Power Source for Electric ARC Welding and Output Chopper.

Australian Patent Application No. 2005202559, Examination Report, 2 pages, dated Nov. 1, 2006.

Balogh, Laszlo et al., "Unique Cascaded Power Converter Topology for High Current Low Output Voltage Applications," Texas Instruments Incorporated, 24 pages, 2001.

Bodur, Hacy et al., "A New ZVT-PWM DC-DC Converter," IEEE Transactions on Power Electronics, vol. 17, No. 1, 8 pages, Jan. 2002.

Bodur, Hacy et al., "A New ZVT-ZCT-PWM DC-DC Converter," IEEE Transactions on Power Electronics, vol. 19, No. 3., 9 pages, May 2004.

Brown, Marty, "Appendix C. Power Factor Correction," Power Supply Cookbook, Butterworth-Heinemann, 6 pages, 1994.

Canadian Patent Application No. 2497813, Office Action, 3 pages, dated Nov. 21, 2011.

Canadian Patent Application No. 2497813, Office Action, 4 pages, dated Nov. 6, 2008.

Canadian Patent Application No. 2518125, Office Action, 3 pages, dated Jul. 11, 2012.

Canadian Patent Application No. 2518125, Office Action, 4 pages, dated Mar. 10, 2011.

Canadian Patent Application No. 2526523, Office Action, 4 pages, dated Aug. 5, 2009.

Canadian Patent Application No. 2580041, Office Action, 2 pages, dated Sep. 9, 2011.

Canadian Patent Application No. 2580041, Office Action, 5 pages, dated Jul. 2, 2010.

Cheung, Chun et al., "ISL6558EVAL1—Multi-Phase Power Conversion for Routers and PC-Peripherals Up to 100A," Publication No. AN1029.2, Intersil Americas Inc., 24 pages, Nov. 2002.

Chinese Patent Application No. 200510084079.1, Patent Certificate for Invention, 1 page, Jul. 15, 2009.

Chinese Patent Application No. 2005100840791, Office Action, 10 pages, dated Aug. 8, 2008.

Chinese Patent Application No. 2005100840791, Office Action, 10 pages, dated Feb. 15, 2008.

Chinese Patent Application No. 200510115823X, Office Action, 13 pages, dated Jun. 13, 2008.

Chinese Patent Application No. 2006100014885, Office Action, 10 pages, dated Aug. 8, 2008.

Cho, Jung-Goo et al., "Novel Zero-Voltage-Transition PWM Multiphase Converters," IEEE Transactions on Power Electronics, vol. 13, No. 1, pp. 152-159, Jan. 1998.

Covi, Kevin, "A Combined Buck and Boost Converter for Single-Phase Power-Factor Correction," 2005 IBM Power and Cooling Technology Symposium, 33 pages, Oct. 7, 2005.

(56) References Cited

OTHER PUBLICATIONS

Czogalla, Jens et al., "Automotive Application of Multi-Phase Coupled-Inductor DC-DC Converter," IAS, 7 pages, 2003.
Dixon, Jr., Lloyd H., High Power Factor Preregulators for Off-Line Power Supplies, Unitrode Power Supply Design Seminar Manual, SEM600, 16 pages, 1998.
Dixon, Lloyd, "Coupled Filter Inductors in Multi-Output Buck Regulators," Unitrode Corporation, 12 pages, 2003.
European Patent Application No. 05005216.6, European Search Report, 3 pages, dated Nov. 10, 2005.
European Patent Application No. 05005216.6, Examination Report, 4 pages, dated Nov. 13, 2009.
European Patent Application No. 05005216.6, Examination Report, 8 pages, dated Feb. 13, 2007.
European Patent Application No. 05025646.0, Examination Report, 4 pages, dated Dec. 16, 2008.
European Patent Application No. 05025646.0, Extended European Search Report, 9 pages, dated Jan. 31, 2008.
European Patent Application No. 06000263.1, European Search Report, 6 pages, dated Jun. 28, 2006.
European Patent Application No. 06000268.0, Examination Report, 3 pages, dated Jan. 9, 2008.
European Patent Application No. 06000268.0, Extended European Search Report, 7 pages, dated Aug. 22, 2006.
European Patent Application No. 07103523.2, Examination Report, 5 pages, dated Jul. 26, 2010.
European Patent Application No. 07103523.2, Examination Report, 5 pages, dated May 25, 2011.
European Patent Application No. 07103523.2, Extended European Search Report, 6 pages, dated Feb. 21, 2008.
European Patent Application No. 11005096.0, Extended European Search Report, 7 pages, dated Oct. 27, 2011.
Fang, Z. D. et al., "Designing a High Efficiency FET Inverter Module for Vector Summation Switching High Power Amplifier," Virginia Polytechnic Institute and State University, no publication date, published prior to Jul. 13, 2004.
Hua, Guichao et al., "A New Class of Zero-Voltage-Switched PWM Converters," HFPC, 8 pages, Jun. 1991.
Hua, Guichao et al., "An Improved Zero-Voltage-Switched PWM Converter Using a Saturable Inductor," PESC, 6 pages, Jun. 1991.
Huang, Wenkang et al., "A Scalable Multiphase Buck Converter With Average Current Share Bus," Applied Power Electronics Conference and Exposition, 7 pages, 2003.
Japanese Patent Application No. 2005-134928, Appeal Decision, 4 pages, May 10, 2011.
Japanese Patent Application No. 2005-134928, Appeal Interrogation, 6 pages, Apr. 27, 2010.
Japanese Patent Application No. 2005-134928, Appeal Office Action, 5 pages, dated Oct. 5, 2010.
Japanese Patent Application No. 2005-134928, Final Office Action, 4 pages, dated Jan. 6, 2009.
Japanese Patent Application No. 2005-134928, Office Action, 9 pages, dated Jun. 24, 2008.
Japanese Patent Application No. 2005-314067, Final Office Action, 4 pages, dated Oct. 7, 2008.
Japanese Patent Application No. 2005-314067, Office Action, 8 pages, dated Apr. 15, 2008.
Japanese Patent Application No. 2006-15765, Appeal Decision, 49 pages, Feb. 23, 2010.
Japanese Patent Application No. 2006-15765, Final Office Action, 4 pages, dated Oct. 7, 2008.
Japanese Patent Application No. 2006-15765, Office Action, 9 pages, dated Apr. 15, 2008.
Japanese Patent Application No. 2006-30436, Appeal Decision, 20 pages, Oct. 11, 2011.
Japanese Patent Application No. 2006-30436, Appeal Interrogation, 4 pages, Jan. 5, 2010.
Japanese Patent Application No. 2006-30436, Appeal Office Action, 4 pages, dated Oct. 5, 2010.
Japanese Patent Application No. 2006-30436, Office Action, 5 pages, dated Apr. 15, 2008.
Jiang, Y. M. et al., "A New Control Scheme for Buck+Boost Power Factor Correction Circuit," Proceedings of the Virginia Power Electronics Seminar, pp. 189-193, Sep. 19-21, 1993.
Jovanovic, Milan M. et al., "Zero-Voltage-Switching Technique. In High Frequency Off-Line Converters," Applied Power Electronics Conference and Exposition, 10 pages, 1988.
Lee, Fred C. et al., "Recent Developments in High-Frequency Quasi-Resonant and Multi-Resonant Converter Technologies," EPE, 10 pages, 1989.
Liu, Kwang-Hwa et al., "Zero-Voltage Switching Technique in DC/DC Converters," IEEE, pp. 58-70, 1986.
Mammano, Bob et al., "Choose the Optimum Topology for High Power Factor Supplies," PCIM, 9 pages, Mar. 1991.
Mohan, Ned et al., Sinusoidal Line Current Rectification With a 100 kHZ B-Sit Step-Up Converter, IEEE, 7 pages, 1984.
Nelson, Carl, "The LT1248 Power-Factor Corrector," Linear Technology Magazine, 4 pages, Jun. 1993.
Ridley, Ray et al., "Analysis and Design of a Wide Input Range Power Factor Correction Circuit for Three-Phase Applications," IEEE, pp. 299-305, 1993.
Ridley, Ray, "The Incredible Shrinking (Unregulated) Power Supply," 6 pages, no publication date, published prior to Jul. 13, 2004.
Sabate, J. A. et al., "Design Considerations for High-Voltage High-Power Full-Bridge Zero-Voltage-Switched PWM Converter," IEEE, 10 pages, 1990.
Schuellein, George, "Multiphase Converter Bucks Power," EE Times, 6 pages, Sep. 11, 2000.
Shortt, D. J. et al., "A 600 Watt Four Stage Phase-Shifted-Parallel DC-TO-Dc Converter," IEEE Transactions on Power Electronics, 8 pages, Apr. 1987.
Smith Jr., K. Mark et al., "Properties and Synthesis of Passive, Lossless Soft-Switching PWM Converters," 1st International Congress in Israel on Energy Power & Motion Control, EPMC '97, 8 pages, 1997.
Streit, Robert, et al., "High Efficiency Tetecom Rectifier Using a Novel Soft-Switched Boost-Based Input Current Shaper," INTELEC '91, IEEE, 7 pages, Nov. 1991.
Tabisz, Wojciech A. et al., "Zero-Voltage-Switched Quasi-Resonant Buck and Flyback Converters—Experimental Results at 10 MHz," IEEE Transactions on Power Electronics, vol. 4, No. 2, pp. 194-204, Apr. 1989.
Tabisz, Wojciech A. et al., "Zero-Voltage-Switching Multi-Resonant Technique—A Novel Approach to Improve Performance of High-Frequency Quasi-Resonant Converter," IEEE Transactions on Power Electronics, 9 pages, Nov. 1989.
Taiwanese Patent Application No. 094141622, Office Action, 4 pages, dated Sep. 23, 2008.
Taiwanese Patent Application No. 094142806, Office Action, 4 pages, dated Sep. 18, 2008.
Todd, Phillip C., "Boost Power Factor Corrector Design With the UC3853," Unitrode Corporation, 24 pages, 1999.
Unitrode Corporation, "High Power Factor Preregulator," 8 pages, Jun. 1998.
Vorperian, Vatche, "Quasi-Square-Wave Converters: Topologies and Analysis," IEEE Transactions on Power Electronics, vol. 3, No. 2, 10 pages, Apr. 1988.
Wang, Li-Qiao et al., "Carrier Phase Shifted SPWM Based on Current Sourced Multi-Modular Converter for Active Power Filter," Journal of Zhejiang University Science, vol. 5, No. 7, pp. 861-866, 2004.
Wong, Pit-Leong et al., "Performance Improvements of Interleaving VRMS With Coupling Inductors," IEEE Transactions on Power Electronics, vol. 16, No. 4, pp. 499-507, Jul. 2001.
Zhimin, Don et al., "Study on Multi-Function Arc Welding Dual Inverter," 4 pages, 1995.
Zumel, P. et al., "Magnetic Integration for Interleaved Converters," IEEE, 7 pages, 2003.
Decision on Appeal in related U.S. Appl. No. 11/051,196 from the United States Patent Trial and Appeal Board, dated Apr. 25, 2017 (12 pages).

(56) References Cited

OTHER PUBLICATIONS

Miller Electric Mfg. Co. "PipeWorx 350 FieldPro and FieldPro Remote Owner's Manual"—2012 (52 pages).
Miller Electric Mfg. Co. "FieldPro Feeder Owner's Manual"—2012 (40 pages).
Miller Electric Mfg. Co. "FieldPro Smart Feeder Owner's Manual"—2013 (52 pages).

* cited by examiner

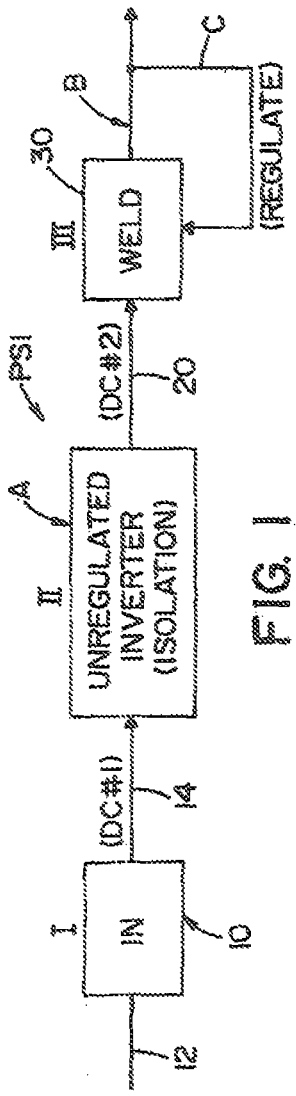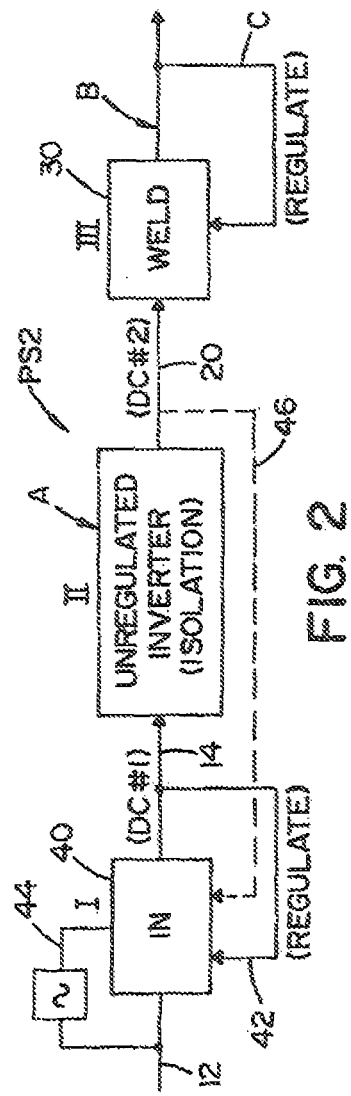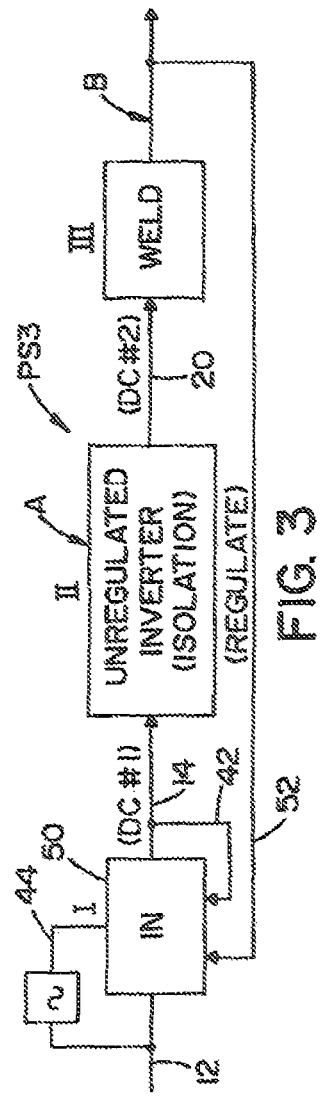

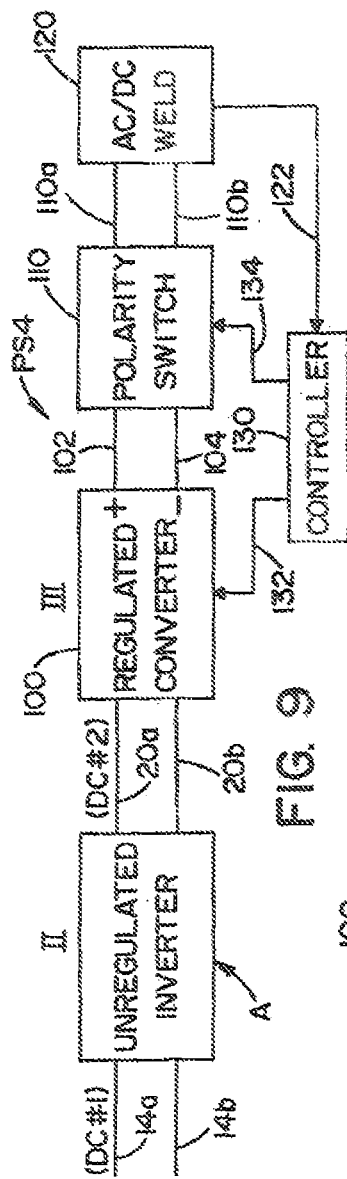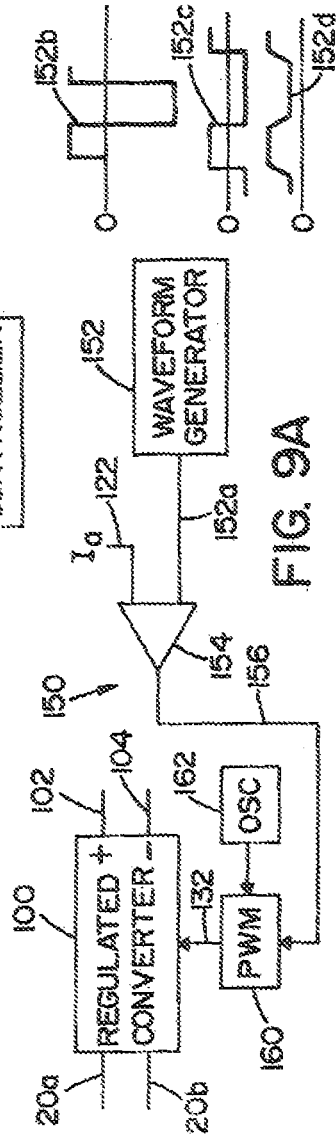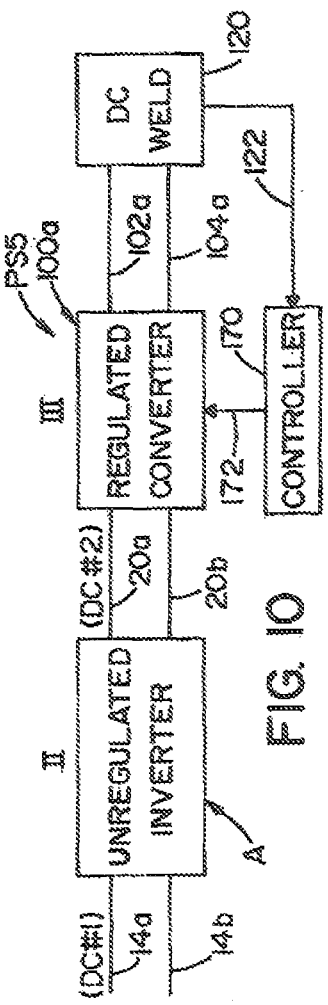

WELDING SYSTEM AND METHOD OF WELDING

PRIORITY

The present application is a continuation in part of U.S. patent application Ser. No. 11/051,196 filed on Feb. 7, 2005, which is incorporated herein by reference in its entirety.

TECHNICAL FIELD OF THE INVENTION

Embodiments of the present invention relates to the field of electric arc welding and more particularly to an improved power source for such welding with improved performance and reliability.

BACKGROUND OF INVENTION

Welding systems which use a welding power supply and a wire feeder and generally known. In these systems, the welding power supply outputs a welding current signal to the wire feeder which directs the signal to a contact tip and ultimately a welding electrode. However, in certain applications the distance between the welding power supply and the wire feeder can be great, requiring very long cables. This can adversely affect the performance of the welding system because it can greatly increase the inductance of the welding circuit. This is particularly problematic when using pulse welding processes which require quick responsiveness. Furthermore, the cables can interfere with the workplace and can break or be damaged. Therefore, there is a need for a welding system which can be used where long distances are in play, but highly responsive welding is needed.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY OF THE INVENTION

Embodiments of the present invention include welding systems having a power source component and a power conversion/wire feeding component. The power source component converts an input power from a utility or generator source to a non-welding power which is then sent to the power conversion/wire feeding component which converts the non-welding power to a welding current, and controls operation of the wire feed. Each of the components are located remote from each other, but the system responsiveness and operation is not compromised because the power conversion/wire feeding component is located near the welding operation. Embodiments of the present invention, allow for the elimination of sense leads, while at the same time improving system performance.

BRIEF DESCRIPTION OF DRAWINGS

The above and/or other aspects of the invention will be more apparent by describing in detail exemplary embodiments of the invention with reference to the accompanying drawings, in which:

FIG. 1 is a block diagram illustrating a three stage power source and disclosing an embodiment of three stage power source improved by the invention;

FIG. 2 and FIG. 3 are block diagrams similar to FIG. 1 disclosing further embodiments of the three stage power source;

FIG. 9 is a block diagram showing the last two stages of the three stage power source wherein the output stage provides AC welding current;

FIG. 9A is a block diagram of a waveform technology control circuit for use in the three stage power source illustrated in FIG. 9, together with graphs showing three welding waveforms;

FIG. 10 is a block diagram illustrating a second and third stage of a three stage power source wherein the output stage is DC welding current;

DETAILED DESCRIPTION OF EXEMPLARY EMBODIMENTS

Figure 4:
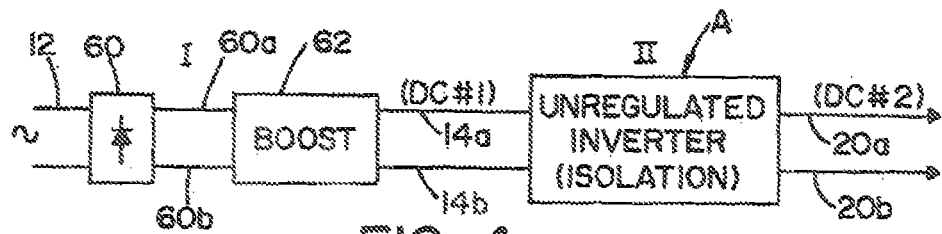
FIGS. 4-8 are partial block diagrams illustrating a three stage power source with different first stage embodiments.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Exemplary embodiments of the present invention are directed to welding systems which use wire feeding mechanisms electrically coupled to the power supply. For example, exemplary embodiments of present invention can be used for GMAW type welding. It should be noted that embodiments of the present invention are not limited by the operation and topology of the power generation and wire feeding mechanisms. That is, embodiments of the present invention can be used with many different types of wire feeder and power supply topologies, including, for example, two-stage or three-stage topologies. This will be further explained below, after the following discussion which is generally related to a three-stage type power supply of the type that can be implemented in the embodiments of the present invention. That is, the following discussion related to FIGS. 1 through 41 is directed to explain the construction and operation of a three-stage power supply, and the overall construction and topologies discussed below are exemplary of the types of components and operations that can be implemented with embodiments of the present invention, with the understanding that the final welding current output stage of the welding system is placed within a wire feeder and it is not within the housing of the remaining power supply components. This will be explained further with regard to FIGS. 41 through 45. With that understanding, the following discussion regarding an exemplary three-stage power supply is provided.

An exemplary power source topology that can be used with embodiments of the present invention is a three-stage topology, examples of which are shown and discussed below. An exemplary three stage power source has an input stage for converting an AC signal into a first DC output bus. This output bus has a fixed voltage level and is directed to the input of a second stage best shown in FIG. 17. This novel second stage of the three stage power source is an unregulated inverter which includes an isolation feature and has a second DC output or second DC bus which is proportional to the DC input bus. The level relationship is fixed by the construction of the unregulated inverter. The unregulated second stage inverter has a switching network wherein the switches are operated at a high switching frequency greater than 18 kHz and preferably about 100 kHz. The switching frequency of the switch network in the unregulated inverter forming the second stage of the power source allows use of small magnetic components. The isolated DC output of the unregulated inverter is directed to a third stage of the power source. This third stage can be either a chopper or inverter which is regulated by a welding parameter, such as current, voltage or power of the welding operation. In the modification this third stage is preferably a chopper. The topography of the three stage power source has an input stage to produce a first DC signal, a second unregulated DC to DC stage to provide an isolated fixed DC voltage or DC bus that is used by the third stage of the power source for regulating the current used in the welding operation. Three examples of a three stage power source to which the present invention is directed are illustrated in FIGS. 1-3. Power source PS1 in FIG. 1 includes first stage I, second stage II, and third stage III. In this embodiment, stage I includes an AC to DC converter 10 for converting AC input signal 12 into a first DC bus 14. The input 12 is an one phase or three phase AC line supply with voltage that can vary between 400-700 volts. Converter 10 is illustrated as an unregulated device which can be in the form of a rectifier and filter network to produce DC bus 14 identified as (DC#1). Since the AC input signal is a line voltage, DC bus 14 is generally uniform in magnitude. Unregulated inverter A is a DC to DC converter with an isolation transformer to convert the DC bus 14 (DC#1) into a second DC bus or second DC output 20 (DC#2). Output 20 forms the power input to stage III which is converter 30. The DC voltage on line 20 is converted by converter 30 into a current suitable for welding at line B. A feedback control or regulation loop C senses a parameter in the welding operation and regulates the current, voltage or power on line B by regulation of converter 30. In practice, converter 30 is a chopper, although use of an inverter is an alternative. By having a three stage power source PS1 as shown in FIG. 1, the switching network of the second stage has a frequency that is normally higher than the switching frequency of converter 30. Furthermore, the DC voltage in line 20 (DC#2) is substantially less than the DC voltage from stage I on line 14 (DC#1). In practice, there is an isolation transformer in inverter A. The transformer has an input or primary section or side with substantially more turns than the secondary section or side used to create the voltage on line 20. This turn ratio in practice is 4:1 so that the voltage on line 20 is ¼ the voltage on line 14.

The general topography of three stage power source is illustrated in FIG. 1; however, FIG. 2 illustrates an implementation wherein power source PS2 has essentially the same stage II and stage III as power source PS1; however, input stage I is an AC to DC converter 40 including a rectifier followed by a regulated DC to DC converter. The converted signal is a DC signal in line 14 shown as a first DC bus (DC#1). The voltage on line 14 is regulated as indicated by feedback line 42 in accordance with standard technology. Thus, in power source PS2 the output welding converter 30 is regulated by feedback loop C. The voltage on line 14 is regulated by feedback loop shown as line 42. Since converter 40 is a power factor correcting converter it senses the voltage waveform as represented by line 44. By using power source PS2, the first DC bus 14 is a fixed DC voltage with different one phase or three phase voltages at input 12. Thus, output 20 is merely a conversion of the DC voltage on line 14. DC#2 is a fixed voltage with a level determined by the isolation transformer and the fixed duty cycle of the switching network in unregulated inverter A. This is an exemplary implementation of the power source employing three separate and distinct stages with stage II being an unregulated inverter for converting a fixed first DC output or DC bus to a second fixed DC output or DC bus used to drive a regulated welding converter, such as a chopper or inverter. As another alternative, stage I could be regulated by a feedback from the DC #2 bus in line 20. This is represented by the dashed line 46 in FIG. 2.

Power source PS3 in FIG. 3 is another implementation of the three stage power source. The three stage power source of the present invention can have the input converter 50 regulated by feedback loop 52 from the welding current output B. With this use of a three stage power source, converter 50 is regulated by the welding output and not by the voltage on line 14 as in power source PS2. With regulation from welding output B, converter 50 is both a power factor correcting stage and a welding regulator.

Figure 5:
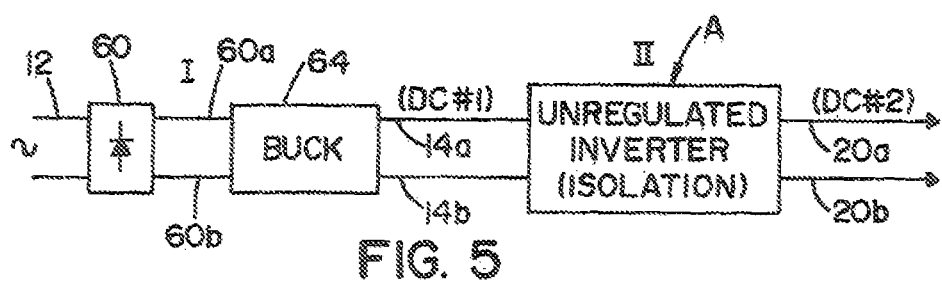
Figure 6:
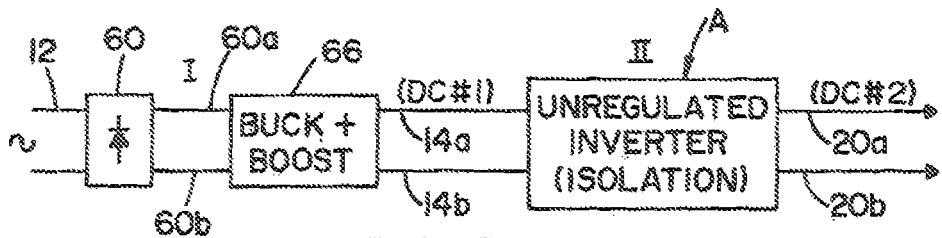
Figure 7:
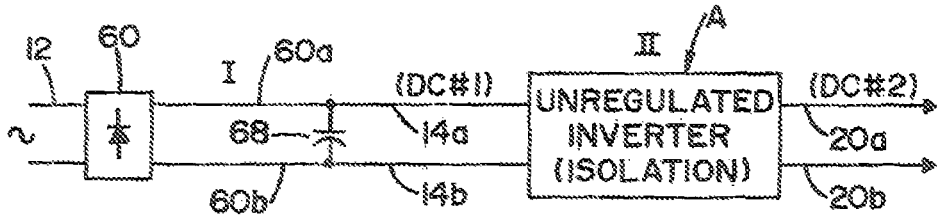
Figure 8:
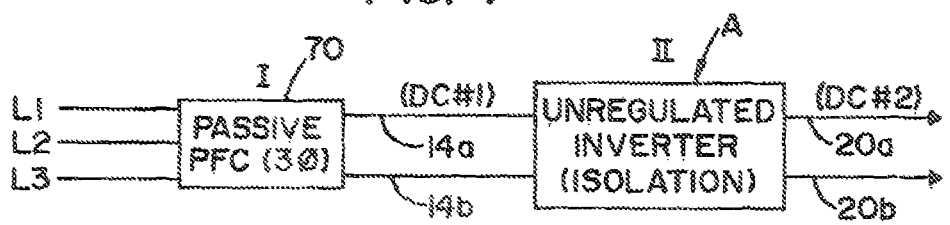

As previously described, input stage I converts either a single phase or a three phase AC signal 12 into a fixed DC bus 14 (DC#1) for use by the unregulated inverter A constituting second stage II. The novel three stage power source generally employs a DC to DC converter in stage I to produce the DC voltage indicated as line 14 in FIGS. 1-3. The DC to DC converter of stage I can be selected to create the desired voltage on line 14. Three of these converters are shown in FIGS. 4-6 wherein an input rectifier 60 provides a DC voltage in lines 60a, 60b to a DC to DC converter which may be a boost converter 62, a buck converter 64 or a buck+boost converter 66, as shown in FIG. 4, FIG. 5 and FIG. 6, respectively. By using these converters, the DC to DC converter of stage I incorporates a power factor correcting chip, which chip allows the power factor to be corrected thereby reducing the harmonic distortion at the input of the power source. The use of a power factor correcting input DC to DC converter is well known in the welding art and is used in many prior art two stage topographies. Converters 62, 64 and 66 preferably include a power factor correcting chip; however, this is not required. The main purpose of stage I is to provide a DC bus (DC#1) in line 14, which bus is indicated to be lines 14a, 14b in FIGS. 4-6 to produce a fixed DC voltage (DC#2) in line 20 indicated by lines 20a, 20b in the same figures. Power factor correction is not required to take advantage of the novel three stage topography. A non power factor correcting input stage is illustrated in FIG. 7 where the output lines 60a, 60b of rectifier 60 are coupled by a large storage capacitor 68 to produce a generally fixed voltage in lines 14a, 14b. Stage I in FIG. 7 does not incorporate a power factor correcting circuit or chip. However, the power source still involves three stages wherein the second stage is unregulated isolated inverter A to produce a generally fixed voltage on lines 20a, 20b. Another modification of input stage I is illustrated in FIG. 8 where a passive power factor correcting circuit 70 is connected to a three phase AC input L1, L2 and L3 to produce a generally fixed DC voltage across lines 14a, 14b, which lines constitutes the DC bus 14 (DC#1) at the input of inverter A. The disclosures of modified stage I in FIGS. 4-8 are only representative in nature and other input stages could be used with either single phase or three phase input signal and with or without power factor correcting.

By providing low fixed voltage on output bus 20 illustrated as lines 20a, 20b, the third stage of the novel three stage power source for welding can be a chopper or other converter operated at a frequency greater than 18 kHz. The switching frequencies of the unregulated inverter and the regulated output converter may be different. Indeed, normally the switching frequency of the chopper is substantially less than the frequency of unregulated inverter A. Power source PS4 shown in FIG. 9 illustrates the use of the present invention wherein stage III is a standard regulated converter 100 of the type used for electric arc welding. This converter is driven by fixed input DC bus 20 and is regulated by feedback from the welding operation 120 to provide current suitable for welding across output leads 102, 104. Leads 102 is a positive polarity lead and leads 104 is a negative polarity lead. In accordance with standard output technology for a two stage inverter based power sources, leads 102, 104 are directed to a standard polarity switch 110. This switch has a first position wherein lead 102 is directed to the electrode of the welding operation 120 so the output of polarity switch 110 has a positive polarity on output line 110a and a negative polarity on output line 110b. This produces an electrode positive DC welding process at weld operation 120. Reversal of polarity switch network 110 can produce an electrode negative DC welding process at weld operation 120. Thus, a DC welding process with either DC negative or DC positive can be performed according to the setting of the standard polarity switch 110. In a like manner, polarity switch 110 can be alternated between electrode negative and electrode positive to produce an AC welding process at weld operation 120. This is standard technology wherein polarity switch 110 drives the DC output from regulated converter 100 to produce either an AC welding process or a DC welding process. This process is regulated and controlled by a feedback system indicated as line or loop 122 directed to controller 130 for regulating converter 100 and for setting the polarity of switch 110 as indicated by lines 132, 134, respectively. By regulating the welding operation at stage III, the unregulated inverter at stage II can have a relatively higher switching frequency to reduce the component sizes within the second stage of the power source. The exemplary embodiment of the three stage power source employs waveform control technology pioneered by The Lincoln Electric Company of Cleveland, Ohio. This type of control system is well known and is schematically illustrated in FIG. 9A wherein control circuit 150 processes a waveform profile as a voltage on line 152a is outputted from waveform generator 152. The waveform profile is controlled by feedback loop 122 as schematically illustrated by error amplifier 154 having an output 156. Thus, the profile of the waveform from generator 152 is controlled by the feedback loop 122 and produces a signal in output line 156. This line is directed to an appropriate pulse width modulator circuit 160 operated at a high frequency determined by the output of oscillator 162. This frequency is greater than 18 kHz and is often higher than 40 kHz. The regulated converter 100 preferably operates under about 100 kHz. The output of the pulse width modulator, which is normally a digital circuit within controller 130, is shown as line 132 for controlling the waveform by way of regulated converter 100. In accordance with standard practice, the waveform of inverter 100 can have any profile, either AC or DC. This feature is schematically illustrated as waveform 152b, 152c and 152d at the right portion of FIG. 9A. Waveform 152b is an AC waveform of the type used in AC MIG welding where a higher negative electrode amperage is provided. A higher positive amperage is also common. In waveform 152c, the amperage for both electrode negative and electrode positive is essentially the same with the length of the negative electrode portion being greater. Of course, a process for AC welding can be adjusted to provide balanced AC waveforms or unbalanced AC waveforms, either in favor of electrode negative or electrode positive. When polarity switch 110 is set for either a DC negative or a DC positive welding operation, a pulse welding waveform, shown as waveform 152d, is controlled by waveform generator 152. Various other waveforms, both AC and DC, can be controlled by controller 130 so the welding operation 120 can be adjusted to be AC, or DC. Furthermore, the welding operation can be TIG, MIG, submerged arc or otherwise. Any process can be performed by power source PS4 or other power sources using the present invention. The electrode can be non-consumable or consumable, such as metal cored, flux cored or solid wire. A shielding gas may or may not be used according to the electrode being employed. A modification of power source PS4 to perform only DC welding is illustrated as power source PS5 in FIG. 10. In this power source, welding operation 120 performs only a DC welding operation so that feedback loop 122 is directed to controller 170 having an output 172. Regulated converter 100a is preferably a chopper to produce a DC voltage across lines 102a, 104a. Controller 170 is controlled by waveform generator 152, as shown in FIG. 9A. The polarity on lines 102a, 104a is either electrode negative or electrode positive according to the demand of the DC welding process performed at welding operation 120. Regulated converter 100a is more simplified than the welding output of power supply PS4 shown in FIG. 9. FIGS. 9 and 10, together with the control network or circuit 150 shown in FIG. 9A, illustrates the versatility of the novel three stage power source.

Figure 11:
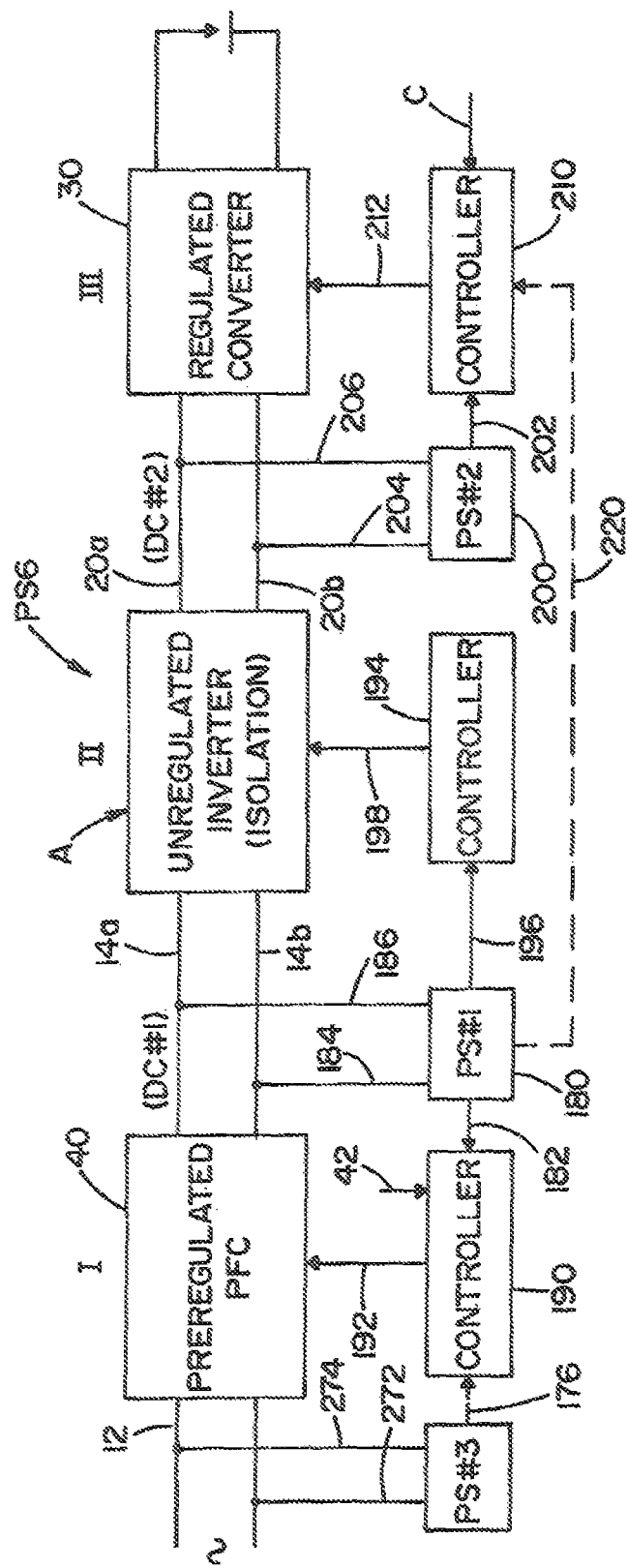
FIG. 11 is a block diagram illustrating the topography of the three stage power source for creating current suitable for electric arc welding with two separate controller control voltage supplies.

It is necessary to provide a voltage for operating the controllers for both the regulated and unregulated switching networks used in these two types of power sources. FIG. 11 illustrates the architecture and scheme employed to obtain control voltages to operate the various controllers of a three stage power source, such as power source PS6. The use of an output of a preregulator to provide the control voltage for the switching controller of the preregulator and switching controller of the second stage of a two stage power source is well known and is disclosed in Moriguchi U.S. Pat. No. 5,926,381, incorporated by reference herein. An output chopper for performing a welding operation routinely obtains the controller control voltage from the input DC voltage to the chopper. These two well known technologies are incorporated in power source PS6. The three stage power source can be operated with controllers having power supplies derived from various locations in the power source. Being more specific, power source PS6 has a power supply 180 with an output 182 and inputs 184, 186 from the first DC bus on leads 14a, 14b (DC#1). Power supply 180 includes a buck converter or flyback converter, not shown, to reduce the high voltage at the output of preregulator 40 of FIG. 2 to a low voltage on line 182. This control voltage may be between 5 and 20 volts. Voltage on line 182 is directed to controller 190 having an output lead 192 for performing the operation of preregulator 40 in accordance with standard technology. The preregulator has regulation feedback lines 42, 44 shown in FIGS. 2 and 3, but omitted in FIG. 11. Unregulated inverter A does not require a controller to modulate the duty cycle or the fixed relationship between the input and output voltages. However, it does require a controller 194 that receives controller operating voltage in line 196 from power supply 180. This arrangement is similar to the concept disclosed in Moriguchi U.S. Pat. No. 5,926,381, except second stage controller 194 is not a regulating controller as used in the two stage power source of the prior art. As an alternative, power supply PS#3 is driven by one phase of input 12 to give an optional power supply voltage shown as dashed line 176. Regulated output converter 30 of stage III has a power supply 200 labeled PS#2 with a controller voltage on line 202 determined by the voltage on DC bus 20 (DC#2) illustrated as including leads 20a, 20b. Again, power supply 200 includes a buck converter or flyback converter to convert the DC bus at the output of unregulated converter A to a lower voltage for use by controller 210 having an output 212. The signal on line 212 regulates the output of welding converter 30 in accordance with the feedback signal on line C, as discussed with respect to power sources PS1, PS2 in FIGS. 1 and 2, respectively. DC bus 14 (DC#1) and DC bus 20 (DC#2) provides input to power supplies 180, 200 which are DC to DC converters to produce low level DC control voltage for controllers 190, 194 and 210. As an alternative shown by dashed line 220, power supply 180 labeled PS#2 can provide control voltage for controller 210. FIG. 11 has been disclosed to illustrate the versatility of using a three stage power source with controllers that can receive reduced supply voltages from various fixed DC voltage levels indicated to be PS#1 and PS#2. Other arrangements could be employed for providing the controller voltage, such as a rectified connection to one phase of AC input voltage 12 by a transformer in a manner illustrated as PS#3.

Figure 12:
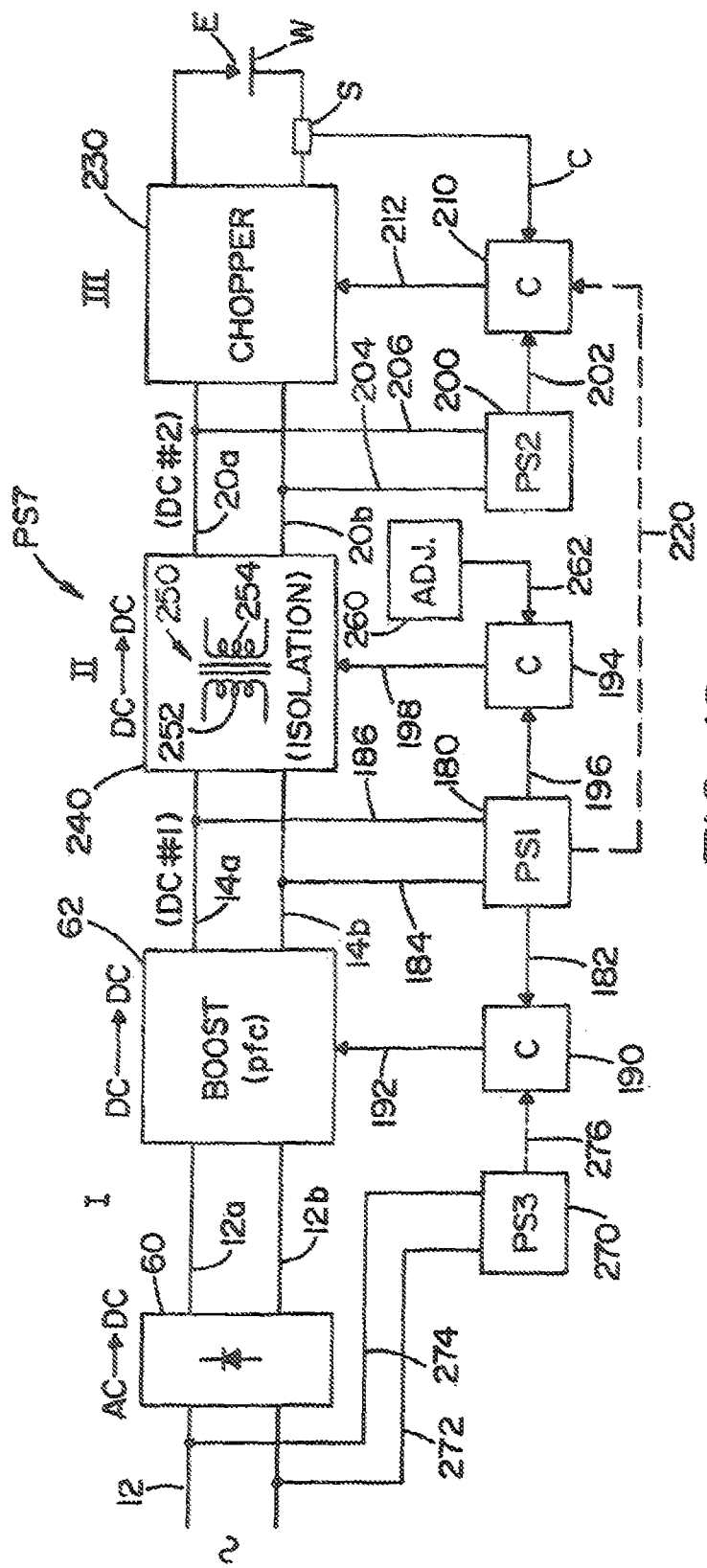
FIG. 12 is a block diagram illustrating a specific three stage power source employing the topography to which the present invention is directed.

Power source PS7 in FIG. 12 is similar to power source PS6 with components having the same identification numbers. The output stage III is a chopper 230 for directing a DC current between electrode E and workpiece W. Current shunt S provides the feedback signal C to controller 210. High switching speed inverter 240 of stage II has characteristics so far described with the isolation provided by transformer 250 having primary winding 252 and secondary winding 254. The primary side of DC to DC converter 240 is the switching network directing an alternating current to primary winding 252. The rectified output from secondary 254 is the secondary section or side of converter 240. Converter 240 employs a high switching speed inverter that has a duty cycle or phase shift set by controller 194. The switching frequency is about 100 kHz in the practical version of this power source. The duty cycle remains the same during the welding operation by chopper 230; however, the duty cycle or phase shift of the inverter may be adjusted as indicated by "ADJ" circuit 260 having an output 262 for adjusting controller 194. The duty cycle is normally close to 100% so that the switch pairs are conductive together their maximum times at the primary side of inverter 240. However, to change the fixed relationship between the first DC bus 14 and the second DC bus 20, circuit 260 can be used to adjust the duty cycle or phase shift. Thus, the unregulated, isolation inverter 240 is changed to have a different, but fixed duty cycle. However, the duty cycle normally is quite close to 100% so the switch pairs are operated essentially in unison. The duty cycle probably varies between 80-100% in normal applications of the three stage power source. In exemplary implementations of the power source, boost converter 62 shown in FIG. 4 is used for a power factor correcting input stage I. This boost converter is operated in accordance with controller 190 having a control voltage 182 as previously described. In accordance with a slight modification, supply 270 has a transformer connected by lines 272, 274 across one phase of a single phase or three phase AC input 12. A rectifier and filter in power supply 270 produces a low control voltage in optimal dashed line 276 for use instead of the control voltage in line 182 if desired. These two alternatives do not affect the operating characteristics of power source PS7. Other such modifications of a three stage power source for electric arc welding can be obtained from the previous description and well known technology in the welding field.

Figure 13:
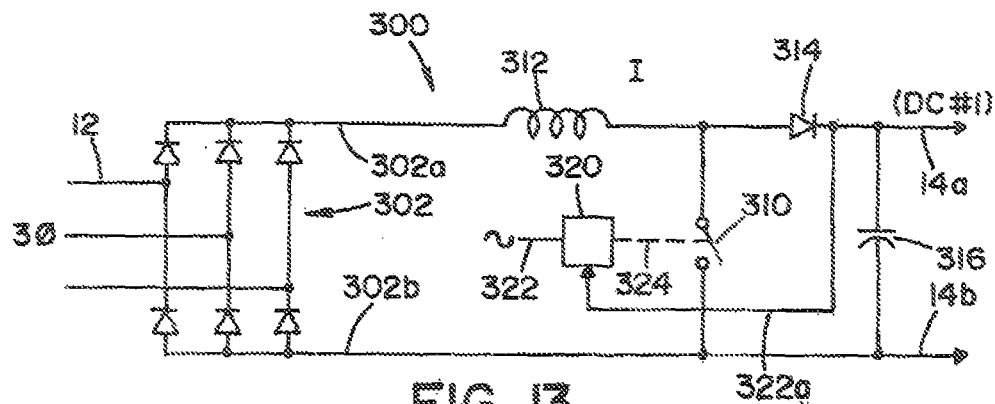
FIGS. 13-16 are wiring diagrams illustrating four different circuits for correcting the power factor in the first stage of the three stage power source.
Figure 14:
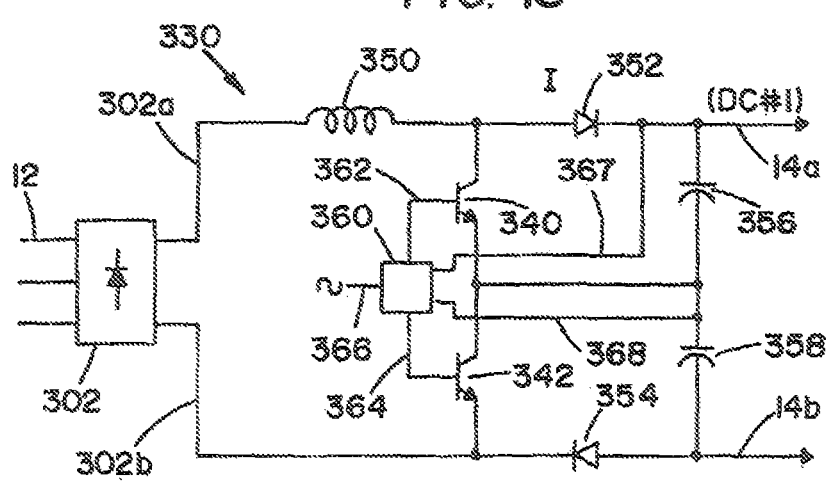
Figure 15:
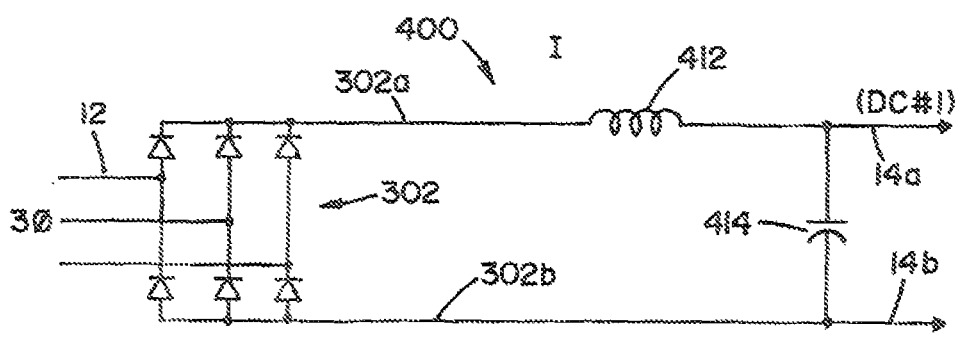
Figure 16:
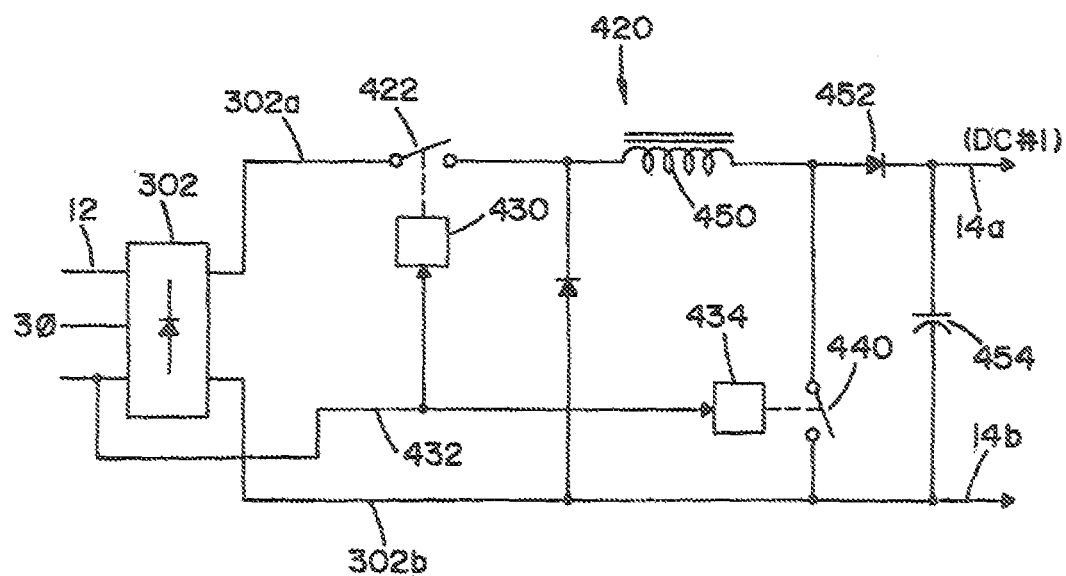

Input stage I normally includes a rectifier and a power factor correcting DC to DC converter as disclosed in FIGS. 4-8. These input stages can be used for both three phase and single phase AC signals of various magnitudes, represented as input 12. Certain aspects of an input stage for three phase AC input power are disclosed with respect to the circuits in FIGS. 13-16. Each of these circuits has a three phase input and a DC bus output (DC#1) that is obtained with a low harmonic distortion factor and a high power factor for the input stage. The disclosure in FIGS. 1-12 are generally applicable to the novel three stage power source; however, the particular stage I used is relevant to both a two stage power source of the prior art or the novel three stage power source. In FIG. 13, the input circuit 300 of stage I includes a three phase rectifier 302 with output leads 302a, 302b. Boost switch 310 is in series with an inductor 312, diode 314 and a parallel capacitor 316. An appropriate circuit 320 which is a standard power factor correcting chip has an input 322 to determine the input voltage, a regulation feedback line 322a and an output 324 for operating the boost switch to cause the current in input 12 to be generally in phase with the input voltage. This chip is a standard power factor correcting boost converter chip that can be used in the present invention and is also used for a normal two stage power source. In a like manner, input circuit 330 shown in FIG. 14 has a three phase rectifier 302 with output leads 302a, 302b as previously described. A boost circuit including inductor 350, diodes 352, 354 and capacitors 356, 358 are used in conjunction with switches 340, 342 to provide coordination of the current at the output of circuit 330 and input voltage 12. To accomplish this objective, a standard chip 360 provides gating pulses in lines 362, 364 in accordance with the sensed voltage in input 366 and feedback regulation signals in lines 367, 368. This is standard technology to provide power factor correction of the type that forms the input of a two stage power source or the novel three stage power source. It has been found that the active three phase input circuits 300, 330 when operated on a three phase input provide an input power factor of about 0.95. The power factor of a stage I when having a single phase AC input can be corrected upwardly to about 0.99. Since a three phase power source can generally be corrected only to a lower level, it has been found that a passive circuit for the input stage I of a two stage or three stage power source is somewhat commensurate with the ability of an active power factor correcting circuit. A standard passive circuit 400 is shown in FIG. 15, wherein each of the three phases is rectified by three phase rectifier 302 which directs DC current through output leads 302a, 302b to a filter circuit including inductor 412 and capacitor 414. It has been found that a passive circuit such as shown in FIG. 15 can correct the power factor of the three phase input to a level generally in the range of about 0.95. This is somewhat the same as the ability of an active circuit for a three phase input circuit. A buck+boost input circuit 420 is shown in FIG. 16. Rectified current on lines 302a, 302b is first bucked by switch 422 using standard power factor correcting chip 430 having a line #32 having a voltage waveform signal from input 12, that also steers chip 434 to operate boost switch 440. Switches 422, 440 are operated in unison to control the input power factor using a circuit containing inductor 450, diode 452 and capacitor 454. Circuits 300, 330, 400 and 420 are standard three phase passive power factor correcting circuits using standard technology and available switches controlled by the input voltage waveform and the current of DC#1. FIGS. 13-16 are illustrative of certain modifications that can be made to the first stage of the three stage power source. Of course, there is other technology for improving the power factor and reducing the harmonic distortion of both DC and AC signals of the type used to drive power sources of electric arc welders.

Figure 17:
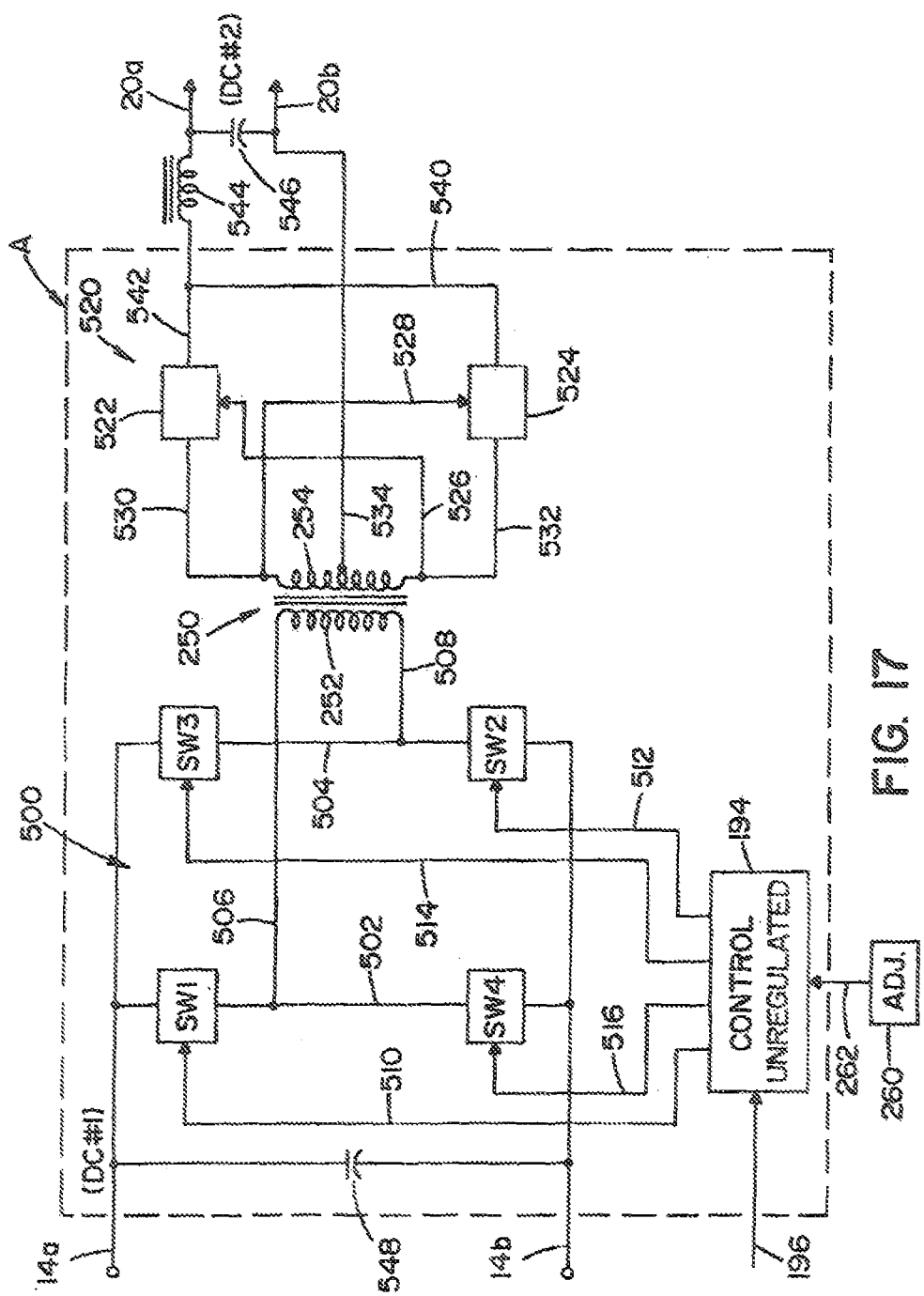
FIG. 17 is a combined block diagram and wiring diagram illustrating an exemplary embodiment of the unregulated inverter constituting the novel second stage of a three stage power source to which the present invention is directed.

Unregulated inverter A of stage II can use various inverter circuits. An exemplary circuit is illustrated in FIG. 17 wherein the inverter is divided between a primary section or side defined by the input to primary winding 252 of isolating transformer 250 and a secondary section or side defined by output of secondary winding 254. Referring first to the primary section or side of inverter A, full bridge circuit 500 is employed wherein paired switches SW1-SW2 and SW3-SW4 are across capacitor 548 are connected by leads 502, 504. The switches are energized in alternate sequence by gating pulses on lines 510, 512, 514, and 516, respectively. Controller 194 outputs gating pulses in lines 510-516 and an adjusted duty cycle determined by the logic on line 262 from circuit 260 as previously discussed. The duty cycle is controlled by changing the phase shift of lines 510 and 512 and lines 514 and 516. Circuit 260 adjusts the duty cycle or phase shift of the paired switches. This adjustment is fixed during the operation of inverter A. In practice, circuit 500 has about 50% duty cycle or phase shift, where each pair of switches has maximum periods of conduction. Preferably the duty cycle is about 100% or 80-100%. Controller 194 has a control voltage from an appropriate supply indicated by line 196, as also previously described. In operation of circuit 500, an alternating current is directed through primary winding 252. This current has an ultra high frequency normally at least about 100 kHz so the components can be reduced in size, weight and cost. The high switching frequency is not dictated by the welding operation, but is selected for efficiency of unregulated stage A of the three stage power source. The secondary section or side of inverter A is a rectifier 520 having synchronous rectifier devices 522, 524. Synchronous rectifier devices are well known in the general electrical engineering art and are discussed in Boylan U.S. Pat. No. 6,618,274 incorporated by reference herein. These devices are gated by signals on lines 526, 528 created at the opposite ends of secondary winding 254 in accordance with standard technology. Leads 530, 532, and 534 form the output leads of rectifier 520 to create a DC voltage (DC#2) across leads 20a, 20b. The current is smooth by a choke 544 and is across capacitor 546, in accordance with standard welding technology. Inverter A is unregulated which means that it is not adjusted by a real time feedback signal from the welding operation. It merely converts DC bus 12 (DC#1) to DC bus 20 (DC#2). This conversion allows a substantial reduction in the voltage directed to the regulated third stage of the power source using inverter A. The reduction in voltage is primarily determined by the turns ratio of transformer 250, which ratio, in an exemplary embodiment, is about 4:1. Thus, the fixed voltage on output bus 20 is about ¼ the fixed voltage on output bus 12 of the first stage. Several advantages of an unregulated stage are contained in an article entitled The incredible Shrinking (Unregulated) Power Supply by Dr. Ray Ridley incorporated by reference herein as background information. A basic advantage is the ability to increase the frequency to above 100 kHz to reduce the size and cost of the inverter stage.

Figure 18:
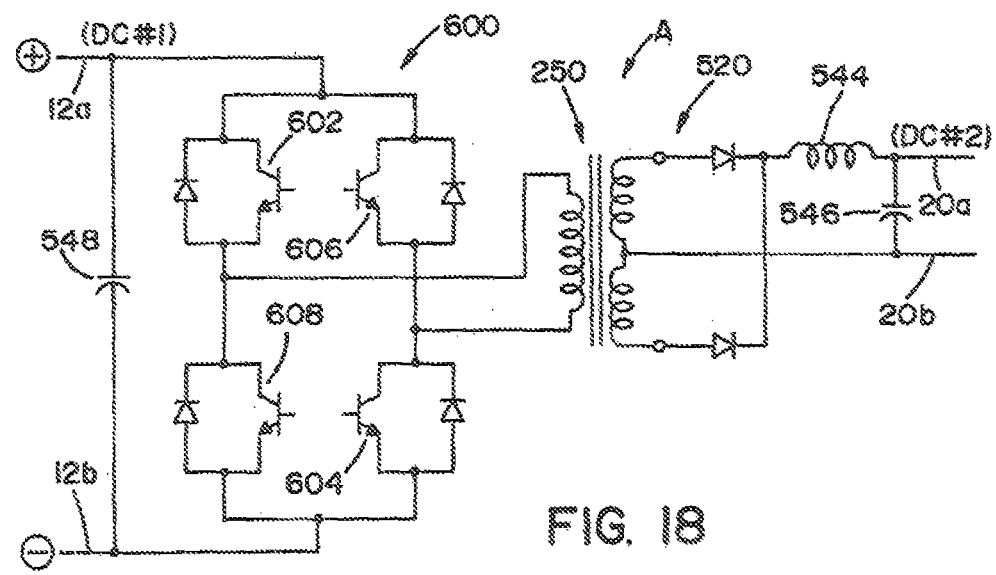
FIGS. 18-21 are wiring diagrams showing several inverters used as the second stage unregulated, isolation inverter comprising the novel aspect of the three stage power source to which the present invention is directed.
Figure 19:
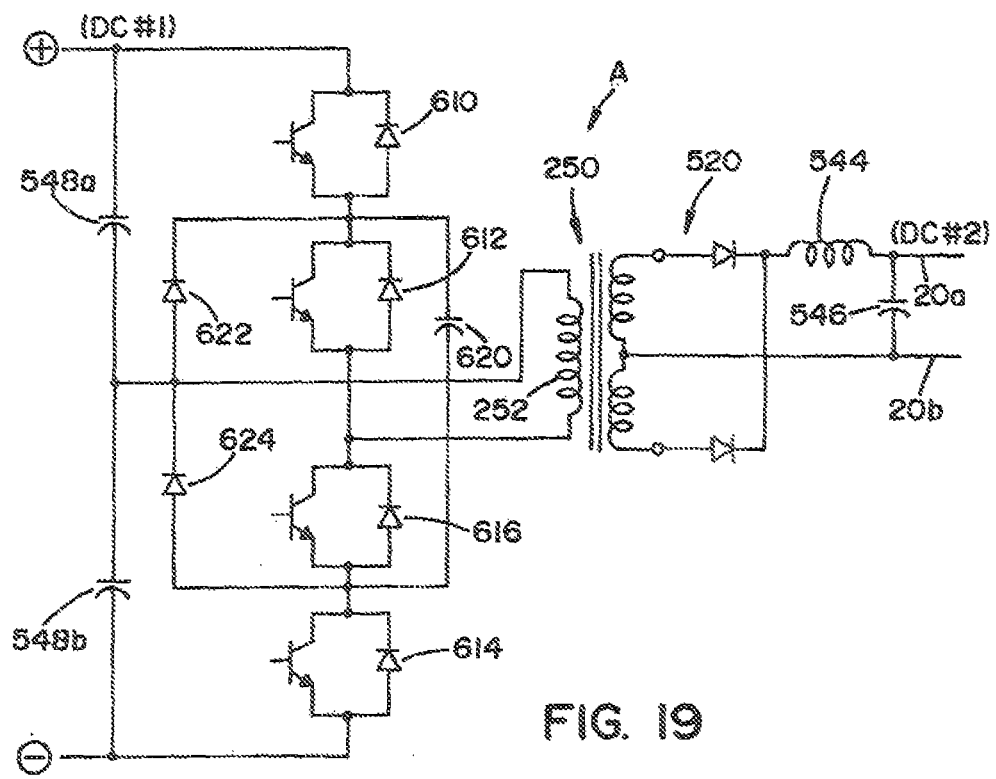
Figure 20:
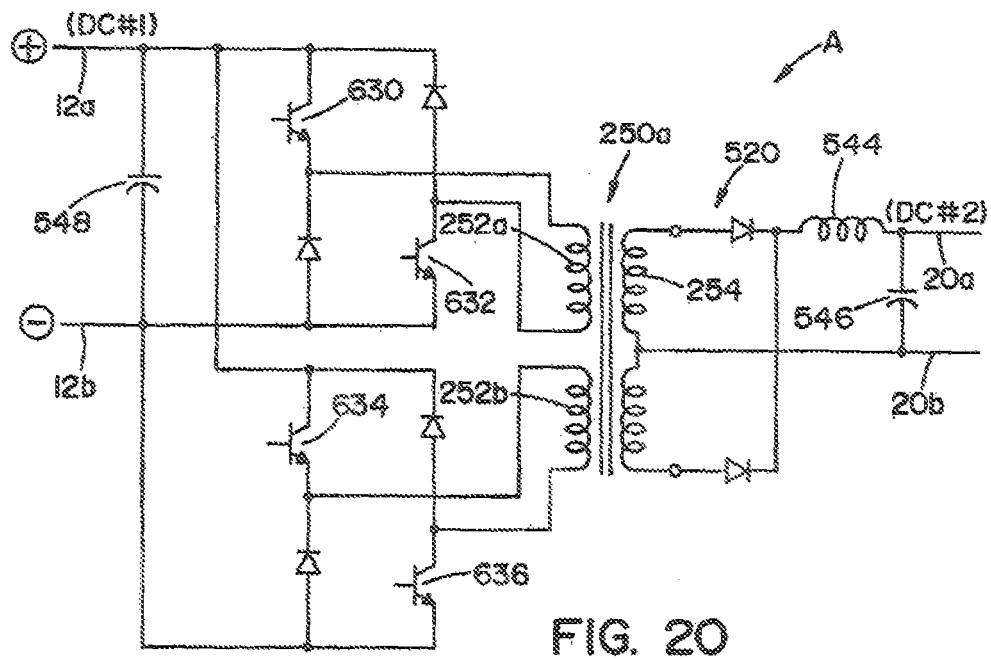
Figure 21:
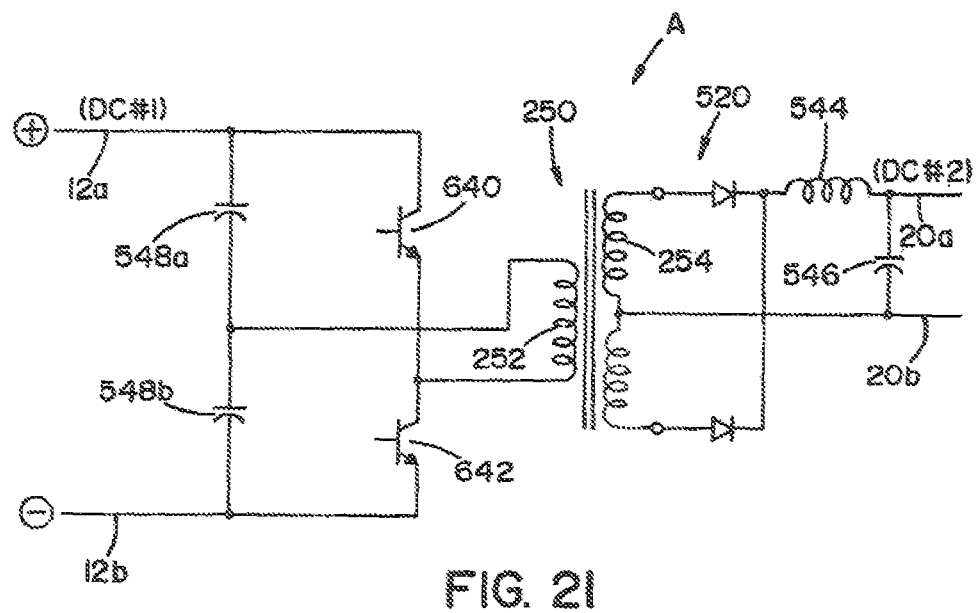

Various circuits can be used for the unregulated inverter A constituting novel stage II of the invention. The particular type of inverter is not controlling. Several inverters have been used. Some are illustrated in FIGS. 18-21. In FIG. 18, inverter A is shown as using a full bridge circuit 600 on the primary side of transformer 250. A switch and diode parallel circuit 602, 604, 606 and 608 are operated in accordance with the standard phase shift full bridge technology, as explained with respect to the inverter A version shown in FIG. 17. A modification of the internal workings for inverter A is illustrated in FIG. 19 utilizing a cascaded bridge with series mounted switch circuits 610, 612 and 614, 616. These switch circuits are operated similar to a half bridge and include input capacitors 548a, 548b providing energy for the switching circuits which in parallel is capacitor 620 and is in series with diode 622, 624. The two switch circuits are in series so there is a reduced voltage across individual switches when a phase shift control technique similar to the technique for the full bridge inverter of FIG. 17 is used. This type of inverter switching network is illustrated in Canales-Abarca U.S. Pat. No. 6,349,044 incorporated by reference herein showing an inverter using a cascaded bridge, sometimes referred to as a three level inverter. A double forward inverter is shown in FIG. 20 wherein switches 630, 632 provide a pulse in section 252a of the primary winding for transformer 250a. In a like manner, switches 634, 636 are operated in unison to provide an opposite polarity pulse in primary section 252b. The alternating pulse produces an AC at the primary winding of transformer 250a to produce an isolated DC output in secondary winding 254. A standard half bridge circuit is shown as the architecture of inverter A in FIG. 21. This half bridge includes switches 640, 642 alternately switched to produce an AC in primary winding 252 of transformer 250. These and other switching circuits can be used to provide an AC signal in the primary winding of transformer 250 so that the secondary isolated AC signal is rectified and outputted on leads 20a, 20b as DC#2. The mere description of certain representative standard switching networks is not considered to be exhaustive, but just illustrative. Control of the welding current is not performed in the second stage. In this stage, a DC bus having a high voltage is converted to a fixed DC bus (DC#2) having a low voltage for the purposes of driving a third stage, which third stage is a regulated stage to provide a current suitable for electric arc welding. Electric arc welding incorporates and is intended to include other welding related applications, such as the concept of plasma cutting. The various circuits used in the three stages can be combined to construct various architectures for the basic topography which is a three stage power source.

Figure 22:
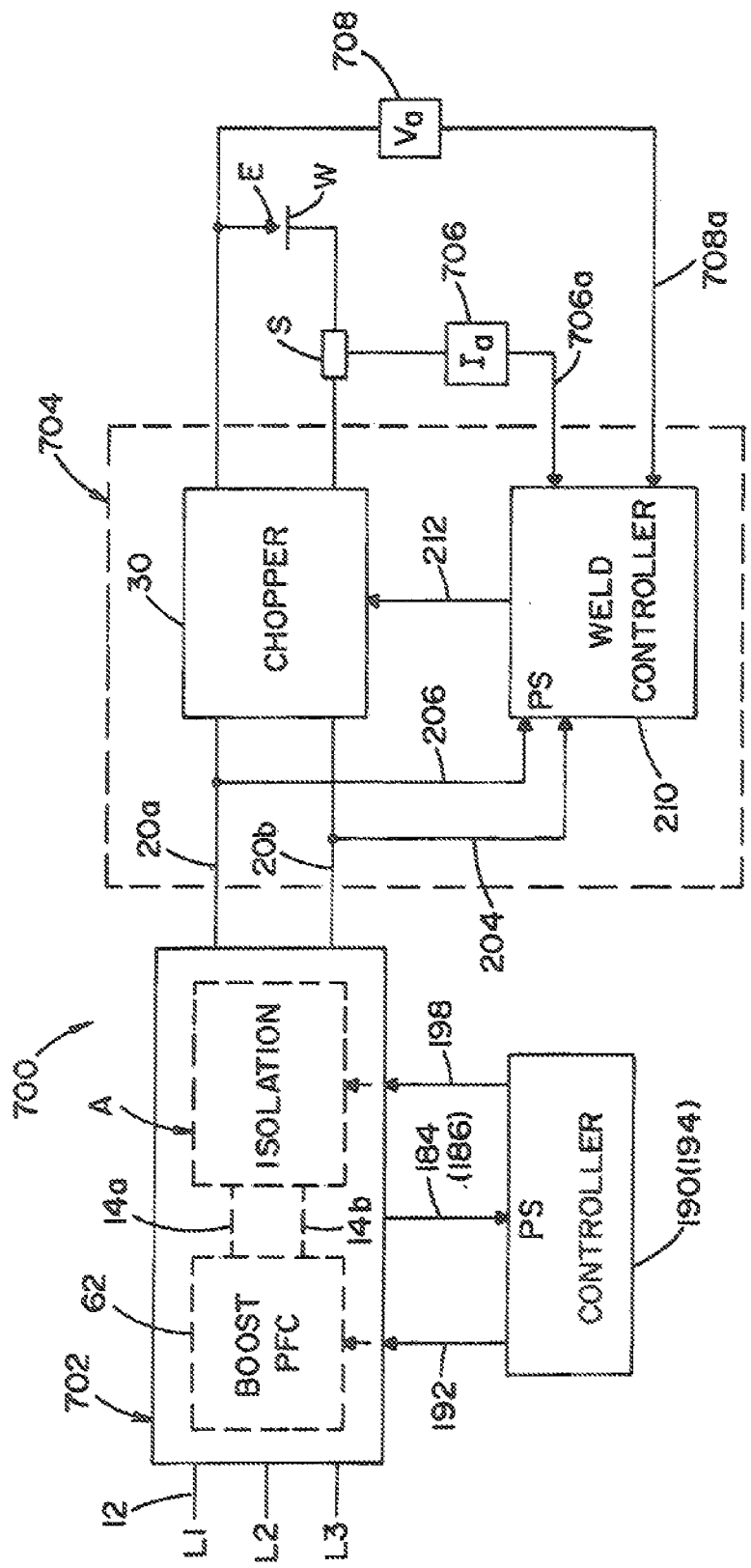
FIG. 22 is as wiring diagram describing the modularized three stage power source of the present invention.

Further exemplary embodiments, as generally represented in FIG. 11, can be formed into a modularized construction, as illustrated in FIG. 22. Power source 700 includes a first module 702 forming a fixed assembled frame on a single base. This module includes the first input stage 62 and the isolation or second stage, in the form of unregulated inverter A. As in FIG. 11, two controllers, shown in two stages such as controller 190 and controller 194, direct control signals on lines 192, 198 into the two separate stages of module 702. The output of first module 702 are lines 20a, 20b (DC #2). This output voltage is directed to a separate, second module or frame 704. The second frame supports the output third stage of the controller, illustrated as chopper 30 in FIGS. 11 and 22. Weld controller 210 controls the output of chopper 30 through a signal on input line 212. This signal is generated by a pulse width modulator under the direction of a wave shaper or waveform generator in controller 210. Power to controller 210 is provided by the second DC bus by lines 204, 206. A feedback current signal from shunt S is received by current sensor circuit 706 that creates a signal on line 706a, representing the output or weld current of the welding operation. In a like manner, voltage sensor circuit 708 detects the voltage across the arc of the welding operation and provides a signal on line 708a representing the welding voltage. These two signals are directed into the feedback circuit of controller 210 to determine the chopper input signal on line 212. By mounting the output third stage on separate module 704, this module can be changed to modify the power source for performing different welding operations. Furthermore different choppers can be used as the third stage of power source 700. The power source is not mounted on a single module, but on an input module 702 and a separate last stage power module 704. Other advantages of this novel modularized construction will be discussed in the implementations of the invention shown in FIGS. 28 and 29.

Figure 23:
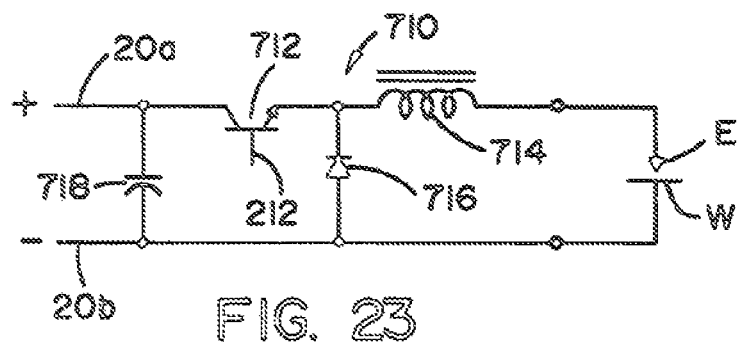
FIG. 23 is a wiring diagram of a standard chopper used as the output module of the invention disclosed in FIG. 22.
Figure 24:
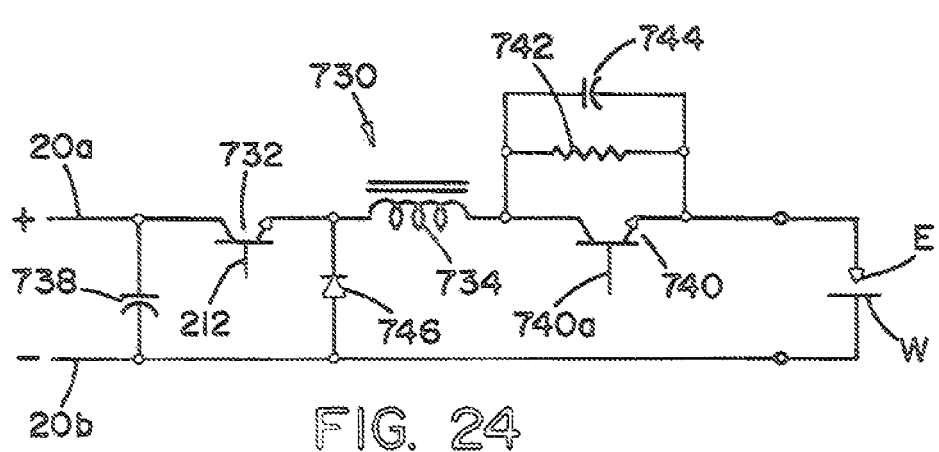
FIG. 24 is a standard STT circuit used for the output module of the invention illustrated in FIG. 22.

FIGS. 23 and 24 show two output circuits for use on module 704. In FIG. 23, chopper 710 is mounted on replaceable module 704 to be operated by controller 210 with a signal on line 212. Chopper 710 includes power switch 712 controlled by high frequency signals on line 212. The signal is created by a pulse width modulator in controller 210. Power switch 712 directs current from input leads 20a, 20b through choke 714 to perform a welding operation between electrode E and workpiece W. Filter capacitor 718 is connected across the DC bus or leads 20a, 20b for controlling the voltage signal to chopper 710. This output chopper is releasably connected to the input leads 20a, 20b to the three stage power source 700 in FIG. 22. Thus, the three stage power source has an output chopper. An output chopper is an exemplary embodiment of the invention; however, the separate module 704 can include another output circuit, such as the STT circuit 730 shown in FIG. 24. This STT circuit includes power switch 732 for directing current pulses through choke 734 to the welding operation between electrode E and workpiece W. The signal on line 212 forms an STT pulse profile at the welding operation. The STT waveform or profile is unique to The Lincoln Electric Company and is described in several patents, such as Parks U.S. Pat. No. 4,866,247 incorporated by reference herein. STT circuit 730 includes premonition switch 740 having an input 740a activated when the short circuit metal transfer is approaching a rupture of the metal neck between the electrode and workpiece. Just before the rupture occurs, switch 740 is closed to increase the current flow for the purposes of separating the short circuited molten metal. When the switch is opened, resistor 742 is connected in the series circuit including choke 734 and electrode E. Capacitor 744 controls the voltage across switch 740 when the switch is opened to transfer current flow to resistor 742. Diode 746 prevents current flow in the reverse direction in resistor 734 to discharge capacitor 744. Input filter capacitor 738 is connected between the DC bus formed by leads 20a, 20b. If an STT welding operation is to be performed by power source 700, module 730 shown in FIG. 24 is used to replace chopper module 710 shown in FIG. 23. These figures illustrate the interchangeability of the output circuit on module 704 to perform different welding operations.

Figure 25:
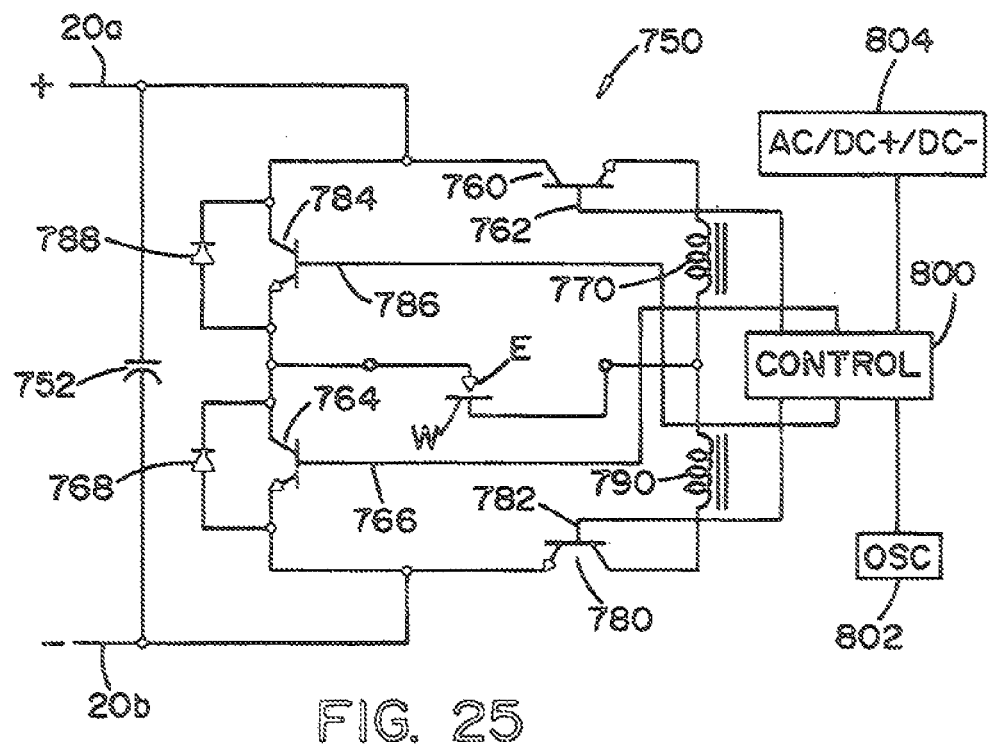
FIG. 25 is a novel dual mode chopper circuit forming another aspect of the present invention and usable as the output module of the invention disclosed in FIG. 22.
Figure 26:
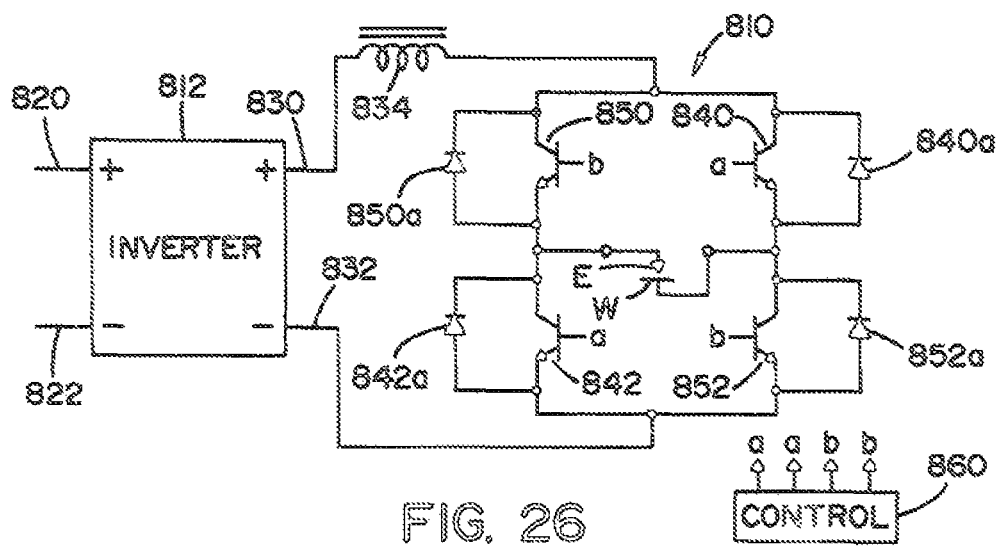
FIG. 26 is a wiring diagram of a prior art output circuit for obtaining AC welding current which is improved by the novel chopper circuit of FIG. 25.

Another aspect of the present invention is a novel output chopper for use on module 704. This new output chopper is shown in FIG. 25, wherein chopper 750 has a dual mode of operation. It has two separate and distinct polarity paths. The first path include polarity switch 760 operated by control pulses on line 762. In series with polarity switch 760 and choke 770 is modulating switch 764 receiving gating pulses on line 766 and having free wheeling diode 788. Operation of polarity switch 760 and modulating switch 764 causes current flow across the gap between electrode E and workpiece W in a first polarity direction. A second path creates a current flow across the welding arc in the opposite polarity and includes polarity switch 780 receiving gating pulses on line 782. Corresponding modulating switch 784 has a gating signal line 786 and free wheeling diode 768. The choke 790 in the second polarity path corresponds to choke 770 in the first polarity path. Switch signal control device 800 creates signals in line 762 and line 766 for operating the first polarity path. In a like manner, signals in line 782 and line 786 causes a current flow in the opposite polarity path. Control 800 has a frequency determined by oscillator 802 and involves a pulse width modulator in the controller in digital format. Device 804 selects the mode of operation. This device allows one of the polarity paths to be operated to merely provide a standard chopper circuit in either the positive or negative direction. By alternating the pulses to the two polarity paths, an AC output signal is created. The modulating switches 764, 784 are essentially the power switches of the two chopper modes in chopper 750. This is a chopper circuit to provide an AC output. A separate and distinct polarity switch as shown in FIG. 9 is not required. Dual mode chopper 750 is novel for electric arc welding and essentially employs a chopper that can be reversed in polarity and can be operated in an AC mode. Thus, the welding operation between electrode E and workpiece W can be shifted between different modes while using the same circuit and with the advantage of a chopper concept. Chopper 750, when operated in the AC mode, is a substantial improvement over the prior art AC welding power source, illustrated in FIG. 26. This prior unit is a full bridge output circuit having separate polarity paths with a double forward bias voltage drop. There is no chopper concept. Voltage 810 is driven by inverter 812 used to convert DC link 820, 822 to output DC bus 830, 832. This DC bus drives the full bridge through choke 834. Bridge 810 has switches 840, 842 operated by leads a and switches 850, 852 driven by leads b. The signals to the switches are created by controller 860 to alternate between the two sets of power switches, each of which has an anti-parallel diode 840a, 842a, 850a and 852a, respectively. The dual mode chopper shown in FIG. 25 can provide not only AC operation, but also output modulating. This is a substantial improvement over bridge 810 and does not need an input inverter 812. Any of the output modules disclosed in FIGS. 23, 24 and 25 can be used in the three stage power source 700, as schematically illustrated in FIG. 22. Module 704 with one of these circuits is used as the output stage connected to two stage input module 702.

Figure 27:
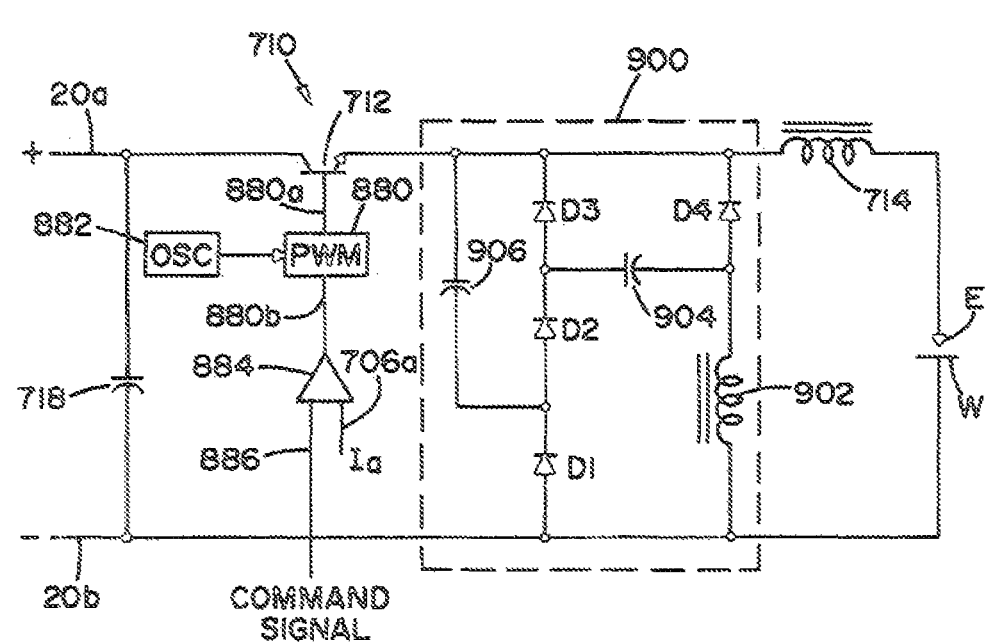
FIG. 27 is a detailed wiring diagram of the output chopper as shown in FIG. 23 with waveform technology control of the power switch and with a commonly used soft switching circuit for the power switch.

In accordance with another aspect of the present invention, the output chopper of module 704 is provided with a soft switching circuit 900, as best shown in FIG. 27. Chopper 710 of FIG. 23 has power switch 712 driven by pulse width modulator 880 at a frequency controlled by oscillator 882. The output 880a of pulse width modulator 880 is controlled by input 880b under the control by comparator 884 that compares a command signal from a wave shaper or waveform generator on line 886 with the feedback circuit signal on line 706a. This is the normal operation for a chopper. Soft switching circuit 900 is a commonly used soft switching circuit. The circuit includes an inductor 902 for controlling current across the power switch and diode D4. Capacitor 906 controls the voltage across the power switch during the switching operations. Capacitors 904 and 906 are connected as shown in FIG. 27 using diodes D1, D2, D3 and D4. These capacitors control the voltage across switch 712. Inductor 902 controls the current through diode D4. Thus switch 712 and diode D4 are soft switched in both the current and voltage during switching operations. This circuit is shown in the University of California article entitled Properties and Synthesis of Passive, Loseless Soft-Switching PWM Converters. This May 1997 article is incorporated by reference herein to explain further the operation of the commonly used circuit 900. In essence, chopper 710 has a power switch with a soft switching circuit to control both the current and voltage during turn-on and turn-off sequences of the power switch. The same type of soft switching circuit is employed for power switches 760, 780 of dual mode chopper 750. In other words, the output chopper on module 74 is provided with a soft switching circuit, which soft switching circuit controls both voltage and current at the appropriate time during the switching operations.

Figure 28:
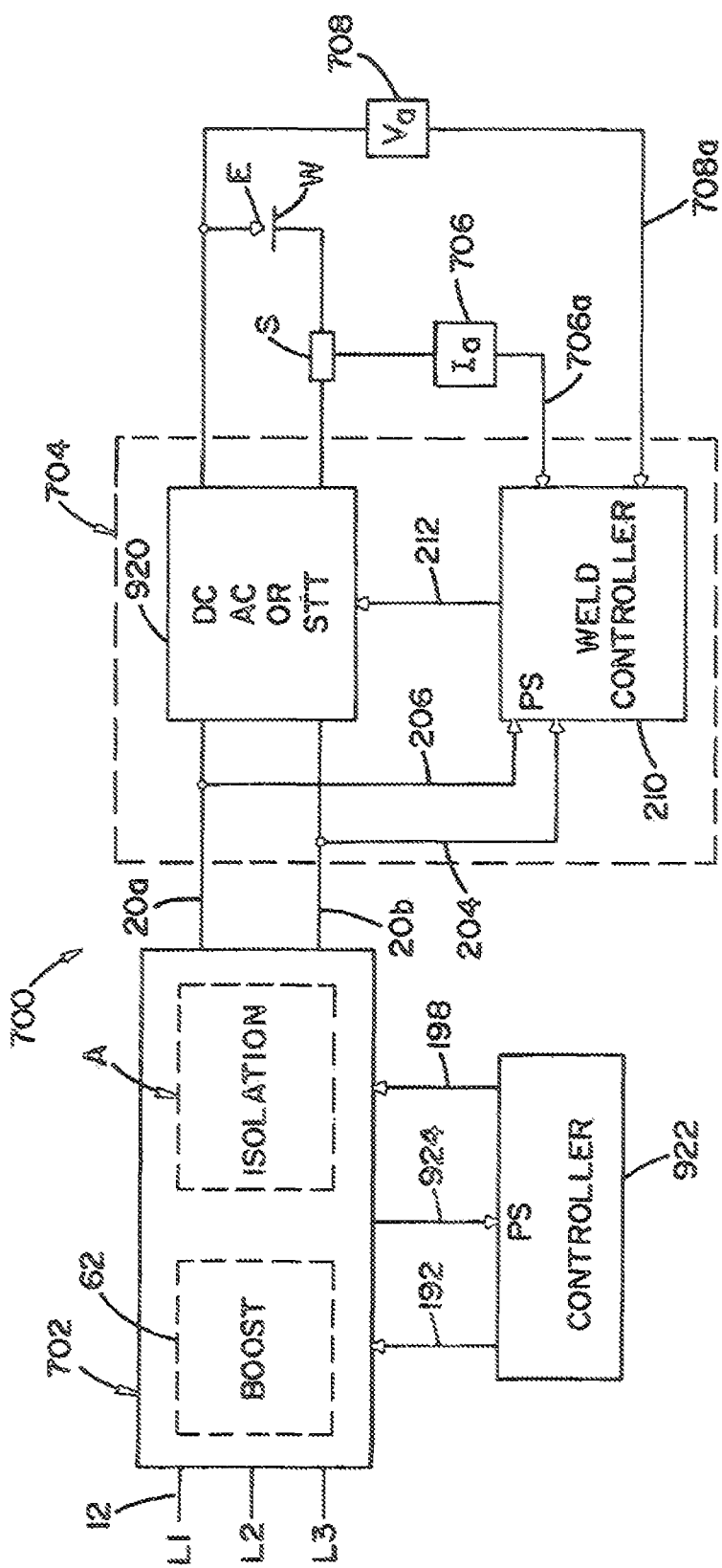
FIG. 28 is a combined block diagram and wiring diagram illustrating one advantage of the embodiment shown in FIG. 22.
Figure 29:
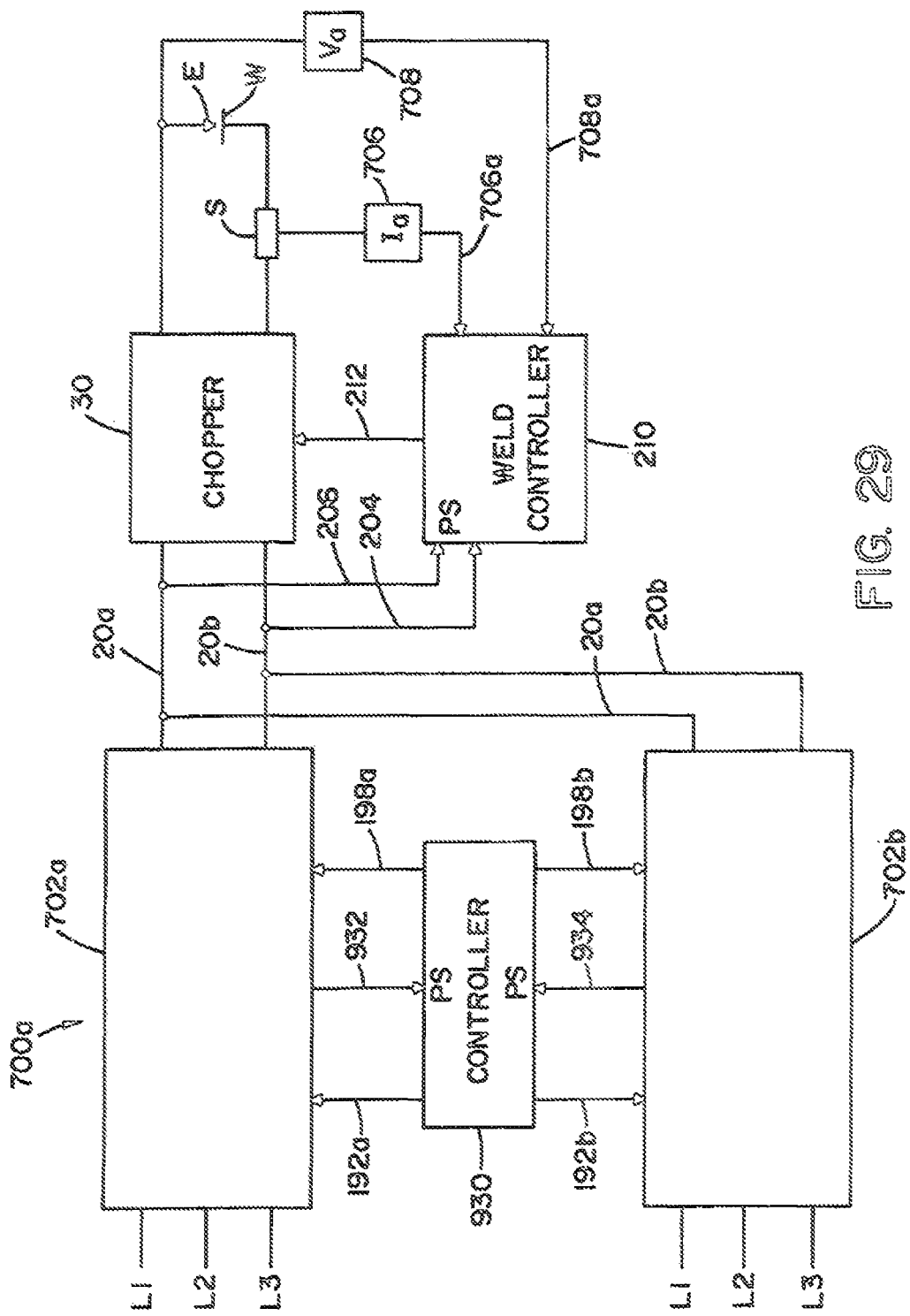
FIG. 29 is a combined block diagram and wiring diagram illustrating still a further advantage of the embodiment illustrated in FIG. 22.

FIGS. 28 and 29 illustrate two advantages of modularizing power source 700. In FIG. 28, module 704 is provided with output power stage 920, which may be a DC chopper as shown in FIG. 23, an AC chopper as shown in FIG. 25 or an STT circuit shown in FIG. 24. By using the invention, different modules 704 can be connected to input module 702 for building different types of power sources, while maintaining the novel three stage topography. Controller 922 combines the functions of controllers 190, 194 shown in FIGS. 11 and 22 and receives control voltage from line 924. Turning now to FIG. 29, a second advantage of using the modularized three stage power source of the invention is illustrated. Two separate input modules 702a, 702b are connected in parallel by interconnecting the output leads 20a, 20b from each of the two input modules. Thus, chopper 30 has an input level which is higher than available from a single module 702. Of course, more than two input modules could be employed to create a substantial amount of welding current at the input of chopper 30. In FIG. 29, power source 700a includes the two input modules 702a, 702b which are controlled in unison by controller 930 through output lines 192a, 198a and output lines 192b and 198b. Control voltage is provided by the DC bus in modules 702a, 702b by lines 932, 934, respectively. Thus, by using a modularized three stage power source of the present invention, the output stage can be selectively changed or the input stage can be parallel. Paralleling of smaller modules reduces the number of modules needed from a wide range of power levels. Two advantages of modularization are illustrated in FIGS. 28 and 29. Other advantages are apparent to create versatility while maintaining the advantage of the novel three stage power source shown in FIGS. 1-21.

Figure 30:
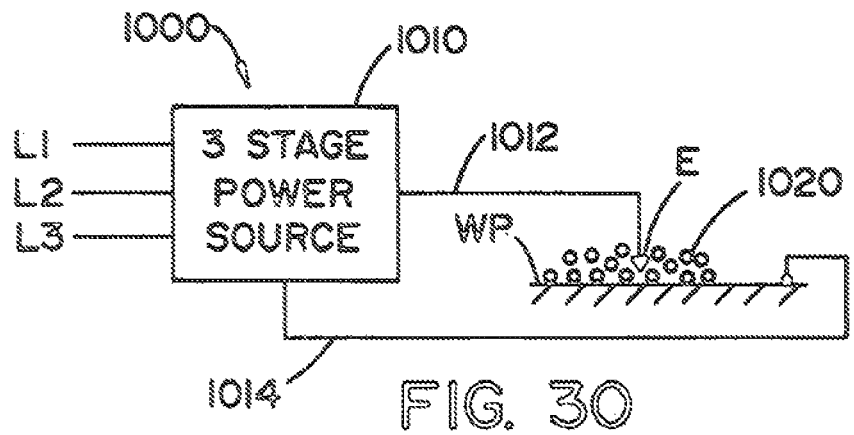
FIG. 30 is a schematic representation of the novel three stage power source combined with a submerged arc welding process.
Figure 31:
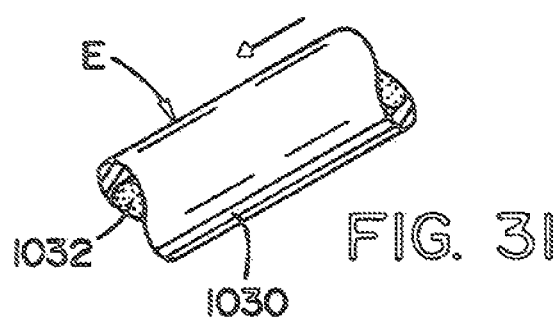
FIG. 31 is a partial pictorial view illustrating a cored electrode which is preferably used in the combination methods schematically illustrated in FIGS. 30 and 32-41.
Figure 32:
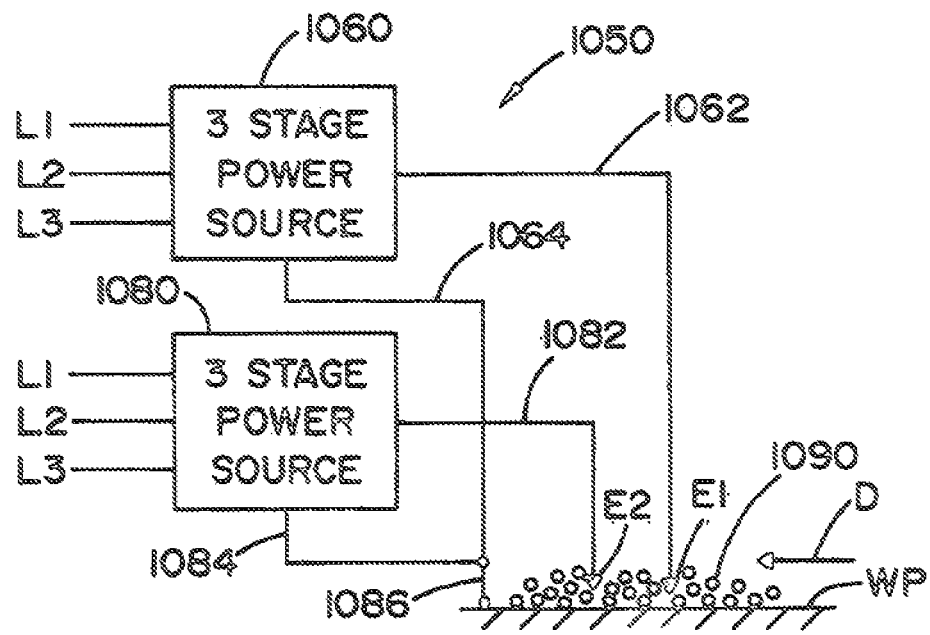
FIG. 32 is a schematic representation of two novel three stage power sources combined with a tandem welding process, which process is illustrated as a submerged arc process.

The power sources disclosed in FIGS. 1-21 and the dual mode chopper shown in FIG. 25 can perform a large number of welding processes. FIGS. 30-41 illustrate the combination of such power sources with these welding processes. In FIG. 30, submerged arc MIG welding process 1000 employs novel three stage power source 1010 having output leads 1012, 1014. Lead 1014 can be a ground lead in accordance with standard technology. The submerged arc welding process involves electrode E movable along workpiece WP and surrounded, at the workpiece, by a mass of granulated flux material 1020. As electrode E moves with respect to workpiece WP, the electrode plows through granular flux 1020 to protect the welding arc and molten metal puddle prior to solidification. In accordance with an aspect of the invention the welding process is performed by the three stage power source disclosed in FIGS. 1-21. In one embodiment of the invention, electrode E is a flux cored electrode, as shown in FIG. 31 wherein the electrode is a wire including an outer metal sheath 1030 surrounding an internal core 1032 containing flux. A flux cored electrode also includes granular material for alloying with the steel of sheath 1030. The inclusion of alloy agents does not change the definition of the electrode as being a "flux cored" electrode. If there is no flux, the electrode can still be a "cored" electrode with metal alloying material in granular form surrounded by sheath 1030. The several welding processes disclosed herein can employ a solid wire, a metal cored electrode or a flux cored electrode, the latter being schematically illustrated in FIG. 31.

In accordance with another aspect of the invention, the three stage power source of FIGS. 1-21 is used in combination with tandem welding process 1050, as illustrated in FIG. 31. This process uses three stage power source 1060 having output leads 1062, 1064. A welding signal is directed to electrode E' movable in direction D along workpiece WP. The second electrode E2 receives a welding signal from three stage power source 180 having output leads 1082, 1084. The output leads of both power sources are connected to workpiece W1 by lead 1086. By moving electrodes E1 and E2 along workpiece WP in direction D, a tandem welding process is performed. This process is illustrated as being a submerged arc process using granular flux 1090. The MIG tandem process of FIG. 32 need not be the submerged arc process and can merely use a flux cored electrode, as shown in FIG. 31. When using the granular flux of a submerged arc welding process, the electrodes are normally solid metal or metal cored.

Figure 33:
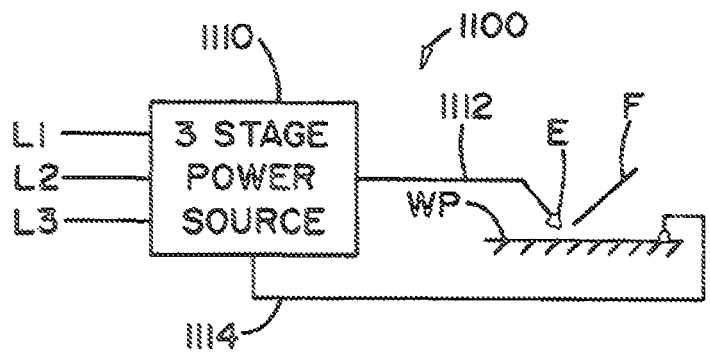
FIG. 33 is a schematic representation of the novel three stage power source combined with a TIG welding process either AC or DC.
Figure 34:
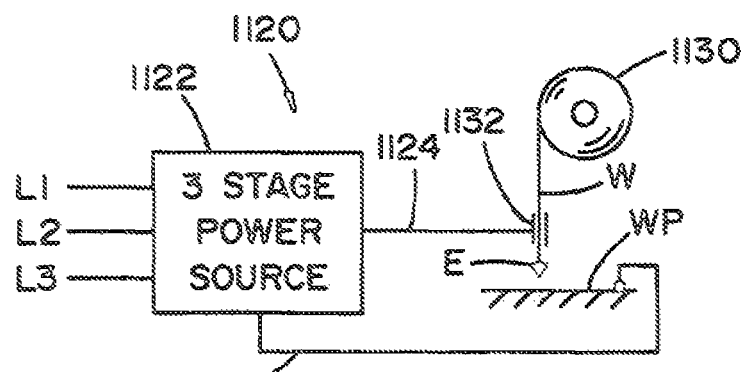
FIG. 34 is a schematic representation of the novel three stage power source combined with a MIG welding process, either AC or DC.

The three stage power source of the present invention is combined with any welding process, such as TIG welding process 1100 shown in FIG. 33. Power source 1110 has output leads 1112, 1114 between electrode E and workpiece WIP. The TIG welding process utilizes a tungsten electrode E, which electrode is not consumed during welding. To provide additional metal for the TIG welding process, filler metal rod F can be used. A similar combination of the three stage power source for generic MIG welding process 1120 is illustrated in FIG. 34. Power source 1122 has output leads 1124, 1126. Electrode E is a welding wire, flux cored or otherwise stored in a supply, illustrated as spool 1130. Consequently, welding wire W is moved through contact tip 1132 into the welding process at workpiece WP. In accordance with standard MIG technology, lead 1124 is connected to contact tip 1132 for directing a welding signal to electrode E. This generic MIG welding process uses, in combination, the three stage power source disclosed in FIGS. 1-21.

Figure 35:
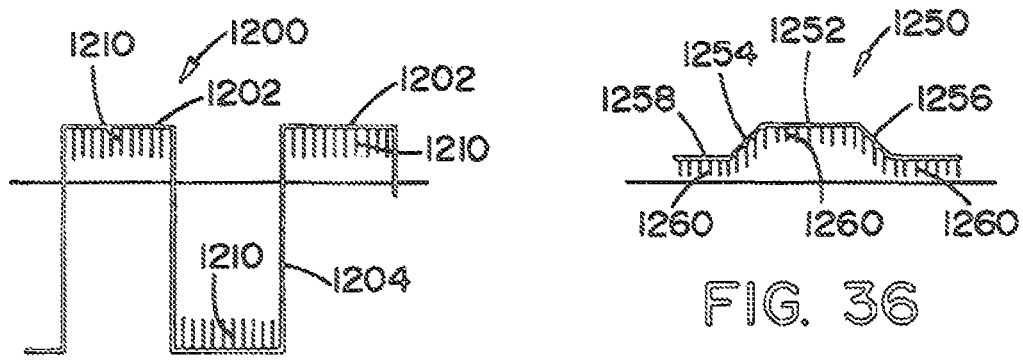
FIG. 35 is a current diagram of an AC output welding signal generated by the novel three stage power source or the novel dual mode chopper of the present invention.
Figure 36:
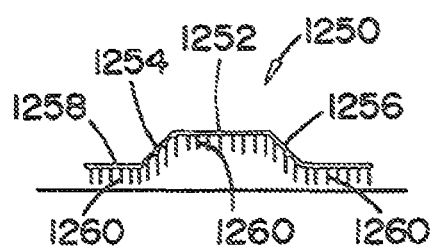
FIG. 36 is a current diagram of a DC output welding signal generated by the novel three stage power source or the novel dual mode chopper of the present invention, which signal can be either negative or positive.

The various welding output signals shown in FIGS. 35 and 36 are created by either the novel three stage power source disclosed in FIGS. 1-21 or the dual mode chopper illustrated in FIG. 25. In FIG. 35, AC welding signal 1200 includes positive portion 1202 and negative portion 1204. These portions are created by a series of closely spaced current pulses 1210 created by waveform technology, where the magnitude of each pulse is determined by a pulse width modulator under the control of a wave shaper or waveform generator. This is in accordance with standard technology pioneered by The Lincoln Electric Company of Cleveland, Ohio. The AC welding signal of FIG. 35 can be replaced by DC welding signal 1250, as shown in FIG. 36. Peak current 1252 can be a fixed value, either positive polarity or negative polarity. In the illustrated embodiment, welding signal 1250 is a pulse signal, wherein peak level 1252 is preceded by ramp up portion 1254 and followed by ramp down portion 1256. This provides a pulse above background level 1258. In accordance with an exemplary embodiment of the invention, the waveform is produced by a series of individual current pulses 1260 created by a pulse width modulator under the control of wave shaper or waveform generator.

Figure 37:
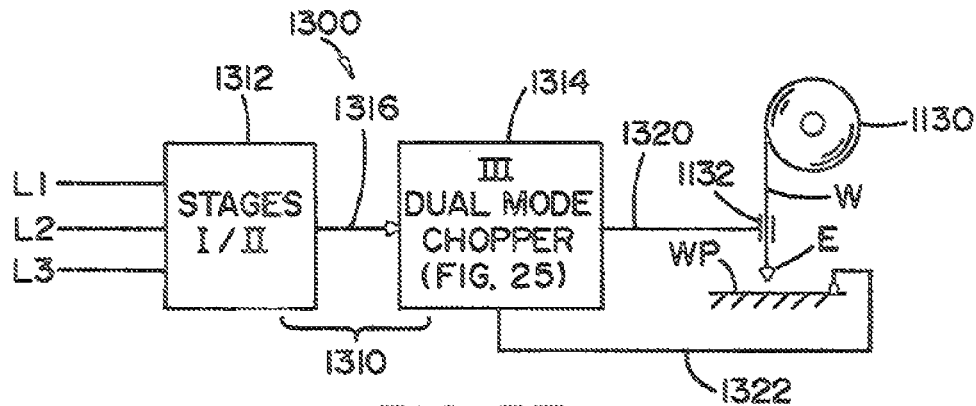
FIG. 37 is a schematic representation of the novel dual mode chopper in the three stage power source combined with a MIG welding process, either submerged arc or otherwise.
Figure 38:
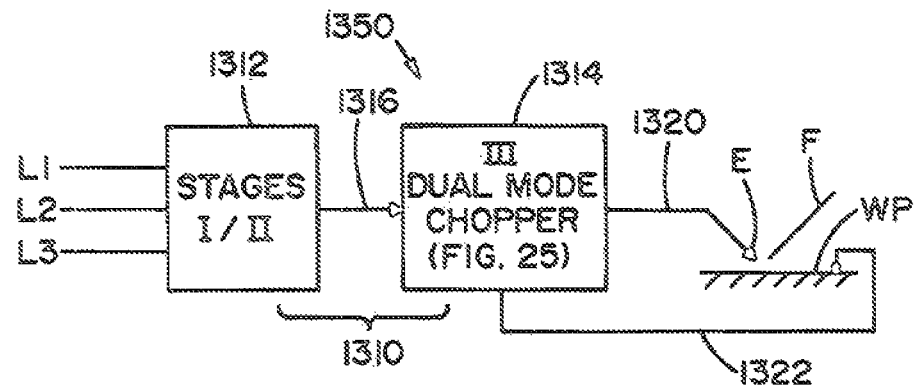
FIG. 38 is a schematic representation of the novel dual mode chopper of the present invention as an output of the novel three stage power source combined with a TIG welding process, either AC or DC.

The process and power source combinations illustrated in FIGS. 30-36 are preferably performed by the novel dual mode chopper output stage as illustrated in FIG. 25. This concept is illustrated in FIGS. 37 and 38. In FIG. 37, MIG welding process 1300, which can be a submerged arc process by using granular flux, is illustrated as being combined with three stage power source 1310 having an input two stage module 1312 directing the output signal from the unregulated isolation DC to DC converter to dual mode chopper 1314. The DC signal driving chopper 1314 is in line 1316. The output welding signal on lead 1320 is a signal such as shown in FIGS. 35 and 36. The welding signal is connected to contact tip 1132 for the MIG welding process 1300. TIG welding process 1350 combined with power source 1310 is illustrated in FIG. 38. The previously used numbers for the various components are used in FIG. 38. A welding signal as shown in FIGS. 35 and 36 is directed to tungsten electrode E by output lead 1320. Filler metal rod F is used to provide additional metal during the DC TIG welding process. Generally this filler metal is not employed for AC TIG welding, although it is available. Generic MIG welding process 1300 and generic TIG welding process 1350, as illustrated in FIGS. 37, 38, respectively, are novel combinations using dual mode chopper 710 disclosed in FIG. 25.

Figure 39:
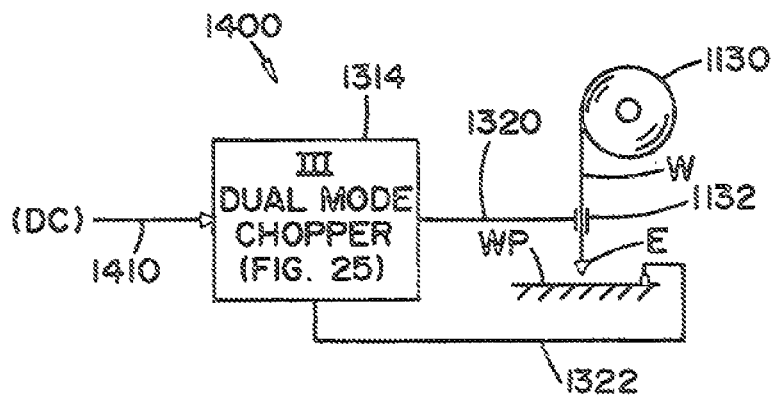
FIG. 39 is a schematic representation of the novel dual mode chopper with a generic DC input signal combined with a MIG welding process.
Figure 40:
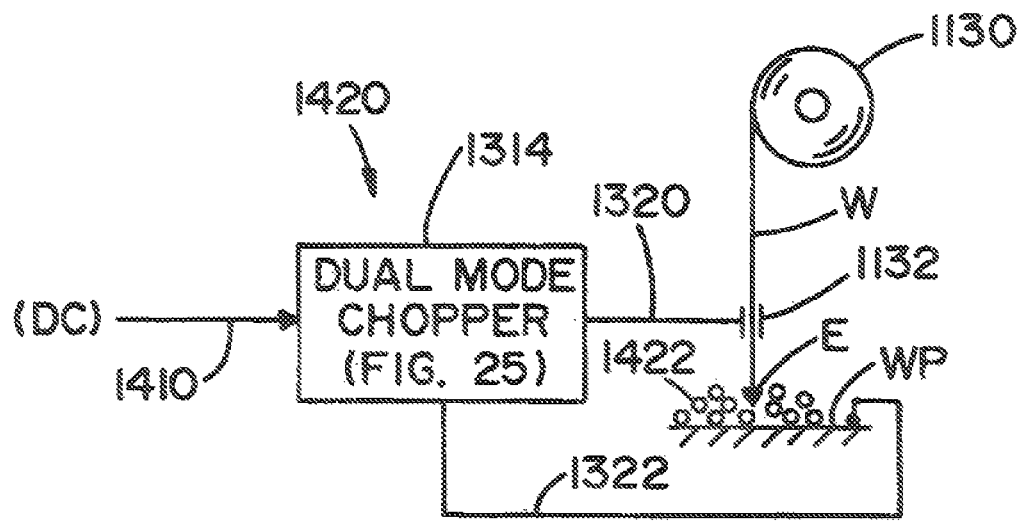
FIG. 40 is a schematic representation of the novel dual mode chopper as illustrated in FIG. 39 wherein the illustrated MIG welding process is a submerged arc process.
Figure 41:
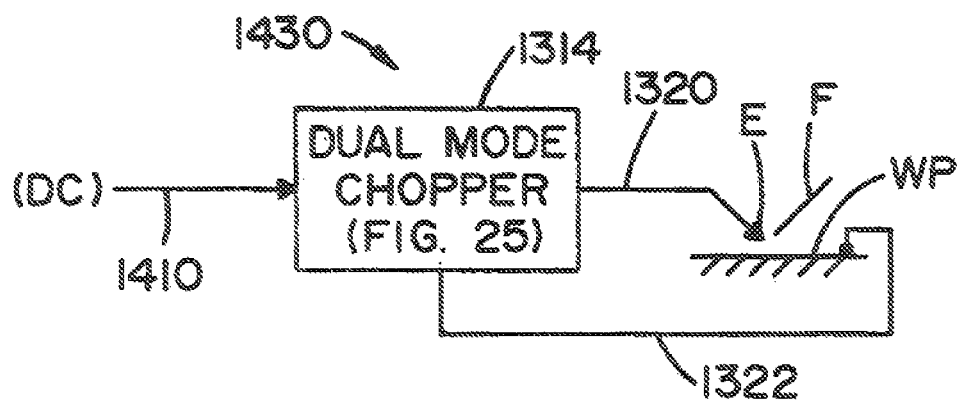
FIG. 41 is a schematic representation of the novel dual mode chopper of the present invention, as illustrated in FIGS. 39-40, in combination with a TIG welding process, either AC or DC.

Dual mode chopper 750, as shown in FIG. 25, can be driven by a DC signal from various isolated input power sources to perform the combined welding processes. Use of a generic DC driving signal is illustrated in FIGS. 39-41, wherein like numbers as previously used correspond to the same or like components. A MIG welding process 1400 is illustrated in FIG. 39, wherein generic DC input 1410 is converted by dual mode chopper 1314 to create an AC or DC welding signal at contact tip 1132. The MIG welding process 1400 of FIG. 39 is converted to a submerged arc MIG welding process 1420 in FIG. 40. This conversion is accomplished by adding granular flux material 1422 around electrode E to protect the arc and molten metal puddle of the welding process. A dual mode chopper with a generic input DC driving signal 1410 is combined with a power source to provide TIG welding process 1430, illustrated in FIG. 41. The AC or DC welding signal on lead 1320 is used by tungsten electrode E for TIG welding at workpiece WP.

As illustrated in FIGS. 30-41, the three stage power source shown in FIGS. 1-21 and the dual mode chopper as disclosed in FIG. 25 are combined with certain welding processes to create novel methods, which novel methods form another aspect of the present invention. The methods illustrated in FIGS. 30-41 disclose the invention of combining welding processes with the novel power sources of the present invention.

Figure 42:
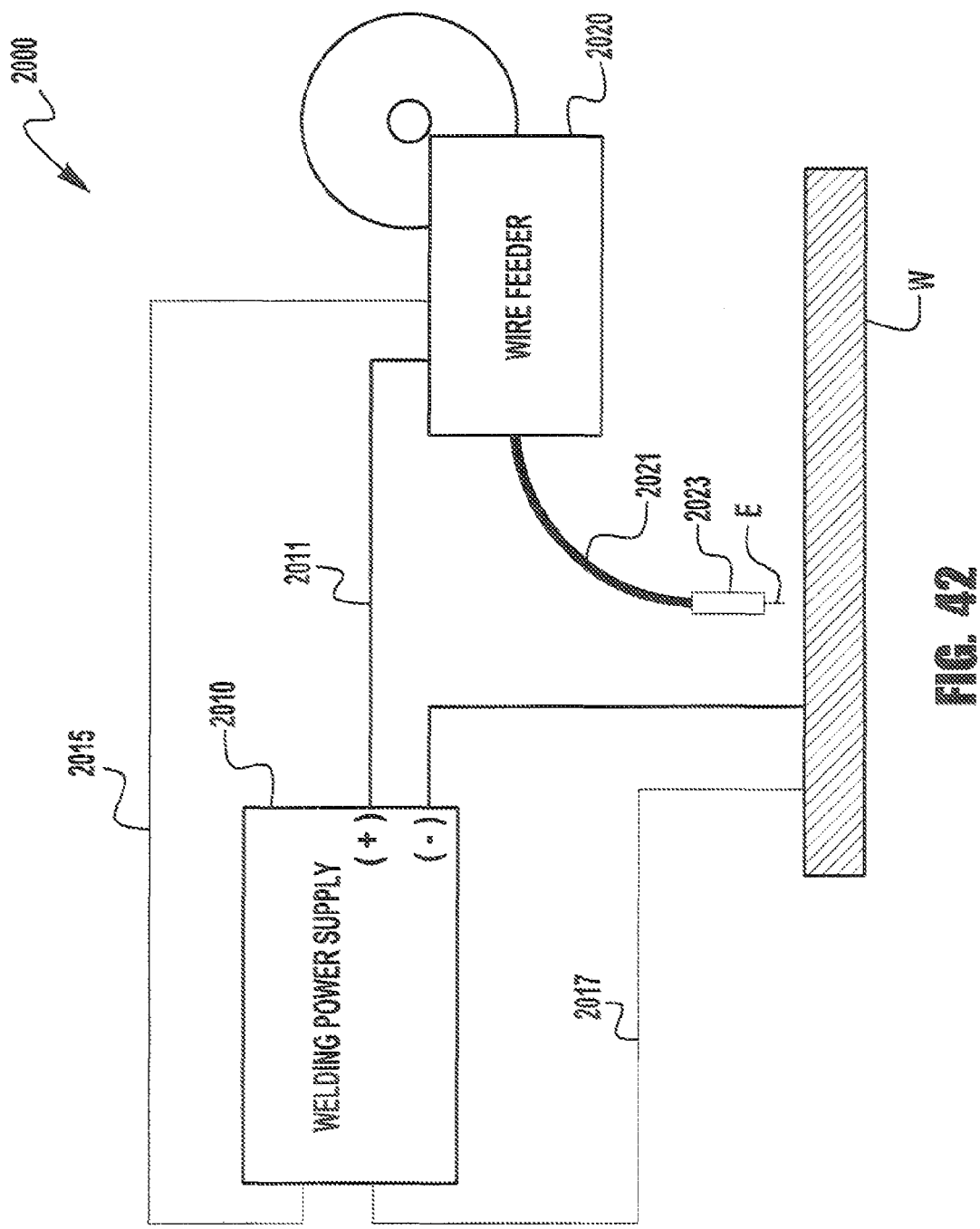
FIG. 42 is a diagrammatical representation of a welding system which can be used with embodiments of the power supply shown in FIGS. 1-41.
Figure 43:
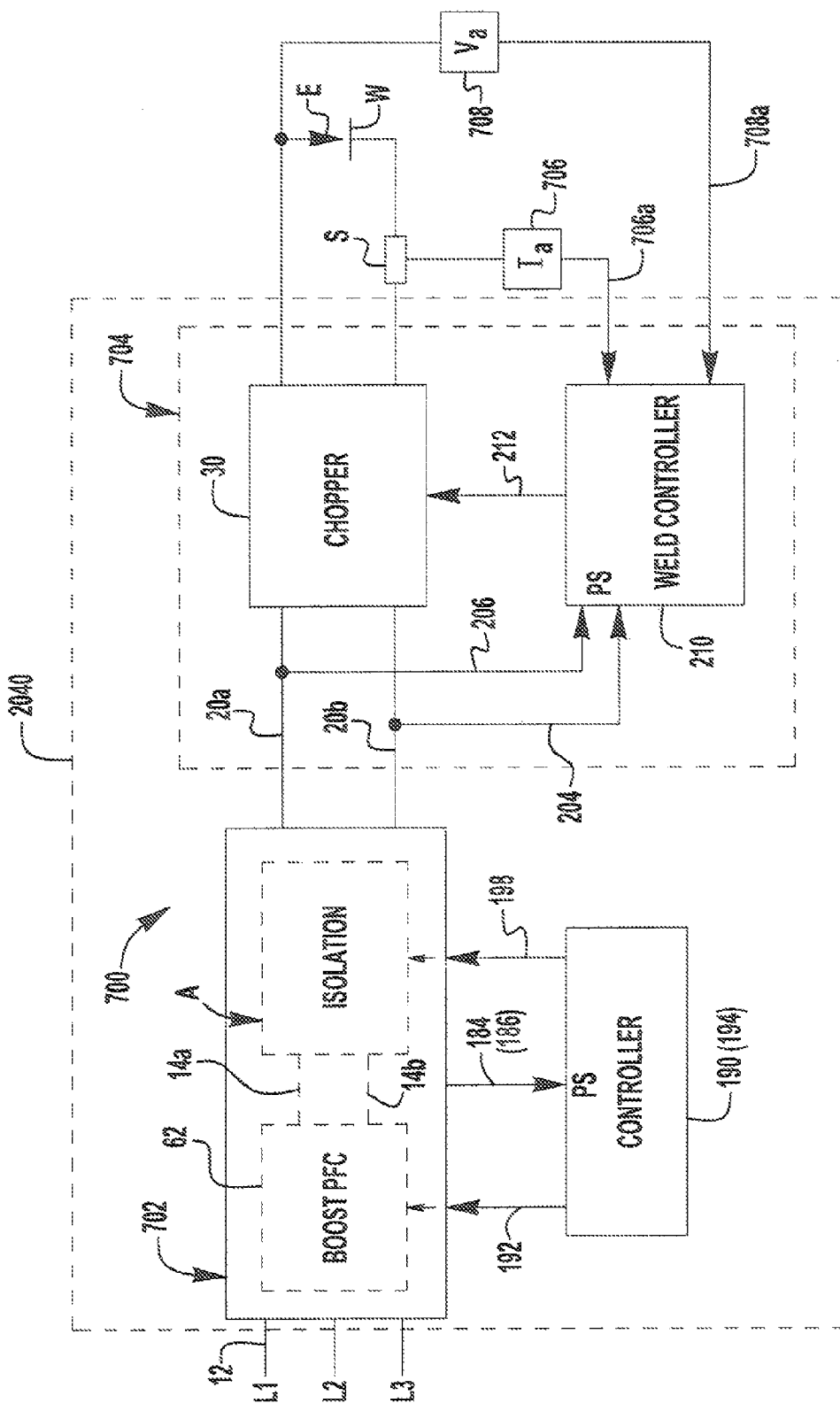
FIG. 43 is a schematic representation of the system of FIG. 22 in a housing.

Turning now to FIG. 42, an welding system 2000 is shown. As is typical the welding system 2000 contains a power supply 2010 coupled to a wire feeder 2020. The power supply 2010 outputs a welding current, which is directed to the wire feeder 2020 so that the wire feeder can pass the current on to the electrode E for welding the workpiece W. A wire feeding cable 2021 delivers the electrode E to a contact tip, which imparts the welding current into the electrode E. Further, a power cable 2011 delivers current from the power supply 2010 to the wire feeder 2020, and a ground cable 2013 couples the power supply 2010 to the workpiece W to provide a ground path. Additionally, sense leads 2015 and 2017 are often used to sense a voltage and/or a current of the welding operation to allow for proper control of the welding operation. Also, although not shown, often a control cable couples the wire feeder 2020 and the power supply 2010 so that these components can communicate with each other. In some applications the control cable is made a part of the power cable 2011, to minimize the number of cables connecting the components. The power supply 2010 can be constructed in accordance with any power supply described herein, or any other known power supply topology. Thus, FIG. 42 represents a generally typical welding system and its detailed operation need not be described in detail herein. FIG. 43 is representative of a welding power source 700 which is enclosed in a single housing structure 2040 consistent with common power source practices. The topology shown in this figure is consistent with that shown in FIG. 22 and its operation and structure will not be repeated.

However, it is noted that in some applications the wire feeder 2020 is positioned a significant distance from the power supply 2010, thus requiring the cables 2011 and 2013 to be quite long. This often occurs when the welding operation is not conducive to having the power supply 2010 close to the welding operation, but the wire feeder 2020 is positioned close by to ensure proper wire feeding. In such applications the sense leads 2015 and 2017 can also be very long. It is in these applications that issues can develop with a welding system. Specifically, long cables and sense leads are expensive and can break from time to time. Further, these long cables can greatly increase the overall system inductance during a welding operation. This increase in inductance can be a detriment to the welding operation because it can adversely affect the overall responsiveness of the welding power supply 2010. This is particularly problematic in pulse welding operations. Further, cables 2011 and 2013 that have been coiled can also undesirably increase the system inductance. Therefore, it is desirable to reduce the overall system inductance as much as possible. As explained below, embodiments of the present invention achieve this goal.

Figure 44:
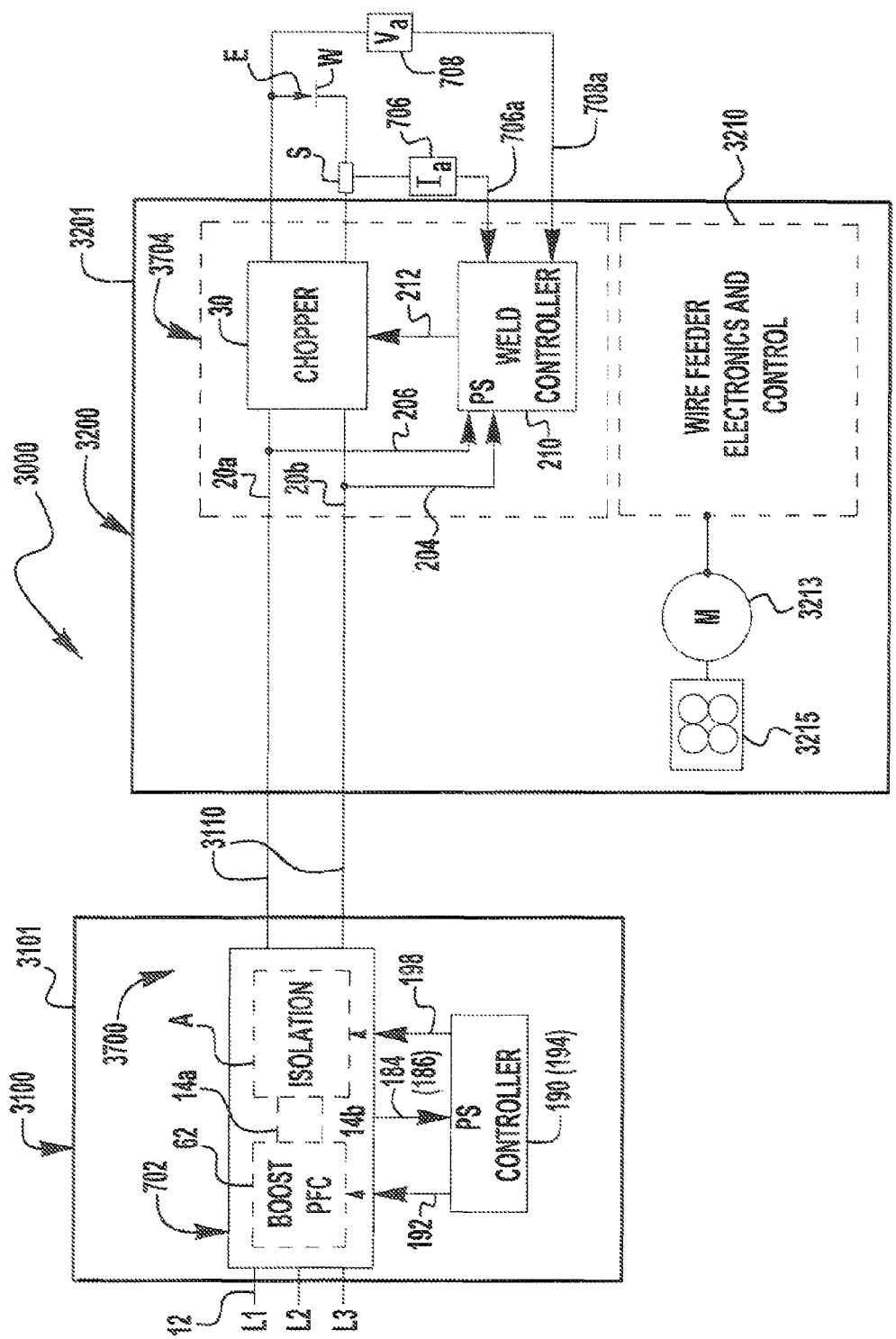
FIG. 44 is a schematic representation of a welding system in accordance with an exemplary embodiment of the present invention.

FIG. 44 depicts an exemplary embodiment of a welding system 3000 of the present invention. The depicted system 3000 comprises a power source component and a wire feeding and power conversion component 3200, separated by power source cables 3110. As shown, each of the components 3100 and 3200 have separate housings are when used are positioned remote from each other. That is, as shown in FIG. 42, the wire feeding/power conversion module 3200 would be positioned nearer the welding operation, while the power source component 3100 would be positioned near the where the input power is provided. The power source component contains a power source module 3700 and has a separate and distinct housing structure 3101 from the wire feeding/power conversion component 3200. The power source component 3100 comprises a power source module 3700 which operates consistent with how similar components were discussed above. For example, the module 3700 converts either a utility or generator input power into a stable, usable power which is transmitted via lines 3110 to the wire feeder/power conversion component 3200. For example, the power source component 3100 can create a stable DC bus (similar to that described previously in relation to FIGS. 1 through 41) which is then used by the component 3200 to output a welding signal.

As shown in FIG. 44, the wire feeder/power conversion component 3200 comprises a power conversion module 3704 and a wire feeder module 3210. The power conversion module 3704 operates similar to the modules 704 discussed previously. That is, the power conversion module 3704 receives the power from the bus 3110 and converts the power to a desired welding signal. That is, the power from the power source component 3100 is not suitable for welding in any way, and it is only after it is converted by the module 3704 that the power can be used for welding. Stated differently, in exemplary embodiments of the present invention the welding signal (i.e., the current signal sent to the contact tip 2023 that is actually used for welding) is generated, controlled and modified within the separate and distinct wire feeder/power conversion component 3200. As shown, the weld controller 210 is actually within component 3200 along with the wire feeder electronics and control 3210. However, the wire feeder/power conversion component 3200 does not contain the circuitry that is needed to convert the input power (at L1, L2 and L3) to usable energy for the module 3704. As shown, exemplary embodiments of the present invention, need two separate and distinct components, with separate and distinct housings to form the system 3000 as shown.

Further, as stated above, the component 3200 also contains all of the needed wire feeder electronics and control circuitry 3210 which are needed to perform the desired wire feeding functions. The wire feeder electronics and control 3210 can be made consistent with known wire feeder mechanisms, and the wire feeder can also receive power from the bus 3110 to power its components and operations. In fact, the weld controller 210 can also control the operation of the wire feeding aspects of the component 3200. As shown, in exemplary embodiments the wire feeder electronics and control circuitry 3210 is coupled to a wire feeding motor 3213, which is mechanically coupled to a pulley structure 3215. The pulley structure 3215 is used to push and/or pull the electrode E to a welding operation. Because the operation and structure of wire feeding devices are known, no detailed discussion of their operation will be provided herein.

Because of the above construction, the system 3000 provides a significant performance improvement over welding systems where the welding power supply (which produces and provides the welding current signal) is separate from a traditional wire feeding mechanism (see FIG. 42). That is, in embodiments of the present invention, the generation and manipulation of the welding current signal is occurring much closer to the welding operation. This significantly reduces the overall inductance of the welding system, by taking the cables 3110 out of the welding current circuit. Moreover, embodiments of the present invention provide improved sensing and thus control over the welding process. This is particularly beneficial in pulse welding operations. Moreover, a control cable between the welding power supply and the wire feeder is no longer needed. In fact, in exemplary embodiments of the present invention sense leads are completely eliminated. Specifically, because of the proximity of the generation of the welding signal to the welding operation, accurate sensing of the welding signal can be achieved by the power conversion module 3704. Thus, embodiments of the present invention eliminate the need for separate sense leads 2015 and 2017 between the welding power supply and the welding operation. This can greatly improve the responsiveness and performance of the welding operation.

Further, although not shown in FIG. 44, embodiments of the present invention also place a welding user interface in the wire feeder/power conversion component 3200 such that the user can read and enter welding information directly on the wire feeder 3200. This makes the operation of the system 3000 easier as it puts the user interface closer to the welding operation. Thus, embodiments of the present invention can greatly reduce the complexity of a welding system, while at the same time significantly improving its responsiveness and performance. This is particularly the case when using pulse-based welding waveforms which require rapid reaction and response by the welding system.

Figure 46:
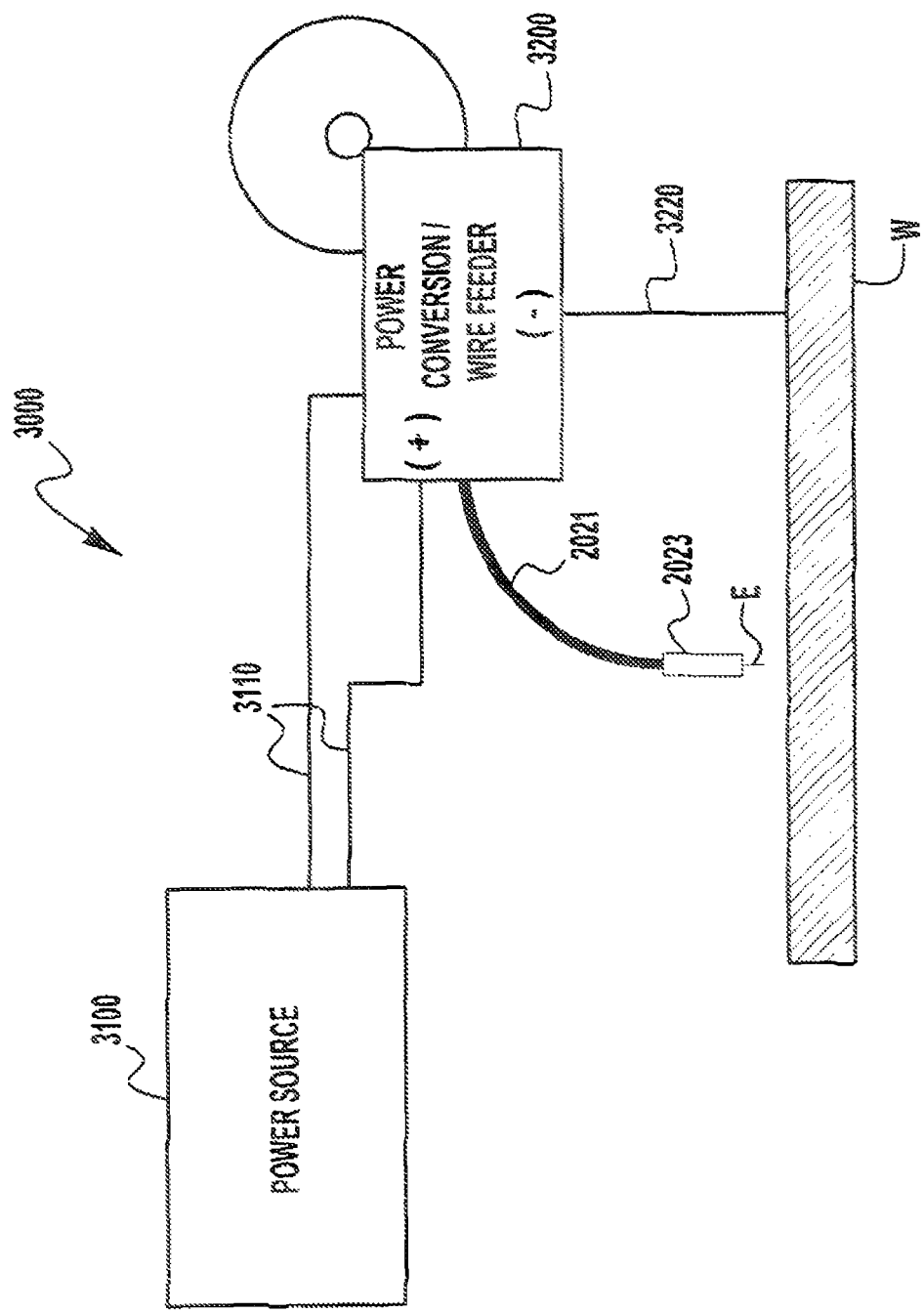
FIG. 46 is a diagrammatical representation of an exemplary welding system and operation using a system consistent with the embodiments shown in FIG. 44 or 45.

An exemplary system is shown in FIG. 46 where it is shown that power conversion/wire feeder component 3200 is positioned close to the welding operation. The component receives its steady state power from the power source component 3100 and there is no connection between the power source component and the work piece. Further, as shown in this embodiment, there are no separate sense leads from either the components 3100 or 3200 to the workpiece or welding operation. Instead the power conversion/wire feeder 3200 uses the sensed current and voltage from the cables 2021 and 3220 to control the welding operation. There is no separate feedback from the welding arc.

As explained above, with exemplary embodiments of the present invention, the power source component 3100 and power conversion/wire feeder component 3200 are separate and distinct components which have their own individual and separate housings. With embodiments of the present invention, these components can be placed apart from each other by very large distances, whereas with traditional welding systems there exists a maximum effective distance between the welding power supply and the wire feeder. For example, traditional systems should not have more than 100 feet in between the power supply and the wire feeder. However, with embodiments of the present invention, that distance can be greatly exceeded without affecting the performance of the welding operation in any way. In fact, the components 3100 and 3200 can be separated from each other by a distance in the range of 100 to 500 feet. In other exemplary embodiments the distance is in the range of 250 to 500 feet.

Figure 45:
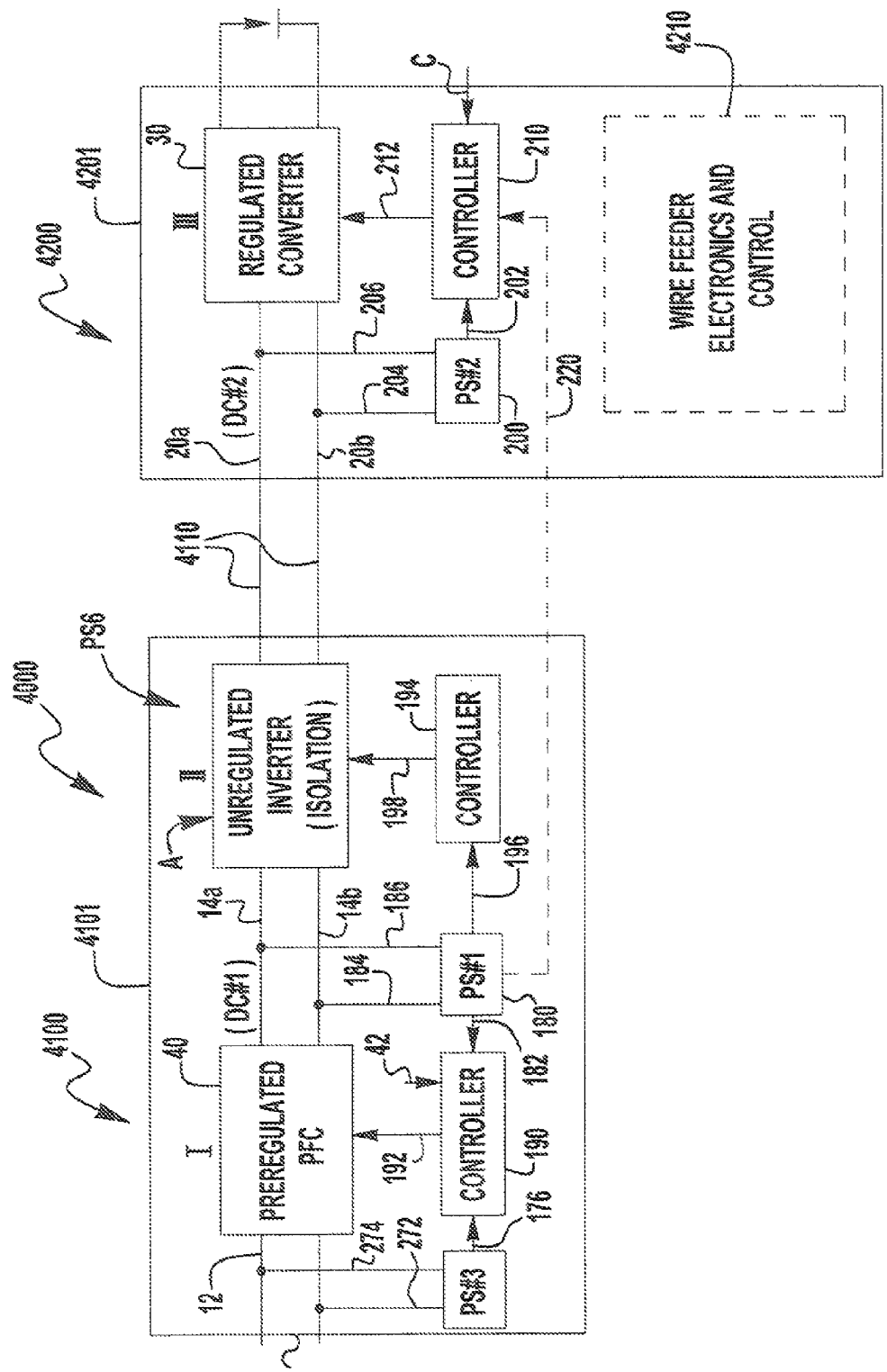
FIG. 45 is a schematic representation of another welding system in accordance with an exemplary embodiment of the present invention.

FIG. 45 depicts another exemplary embodiment of the present invention, where the system 4000 contains a power source component 4100 and a power conversion/wire feeder component 4200 which are separated by cables 4110, which can carry a DC bus as discussed previously. The topology of the welding components of the system 4000 are similar to that shown and discussed in FIG. 11, discussed above. Because the overall operation of the components is discussed relative to that Figure, that discussion will not be repeated herein. However, the system 4000 is similar to the system 3000 in that the components each have their separate housings 4101 and 4201, respectively. Also, as shown the component 4200 also contains the wire feeder electronics and control system and components 4210. Further, as shown, control power for the controller 210 can be provided from the power supply 180 as shown. This control power can be provided by a separate cable and can be coupled to one of the bus cables 4110.

It should be noted that embodiments of the present invention are not limited to using the exemplary three-stage topology described herein, but can also be used with two-stage, or other welding power supply topologies. Further, embodiments are not limited to using inverter-type power supplies. However, in embodiments of the present invention, the signal on the lines 4110 is not a welding signal, and the component 4200 is incapable converting, smoothing, etc. the utility or generator input power to a signal state that can be used by the power conversion module 3704 to create a welding signal.

Further, the power conversion module 3704 can contain any type of welding output structure as desired for a welding operation. That is, the module 3704 can utilize a chopper structure, a regulated converter structure, a STT-type output circuit structure, or any other desired welding output stage. It is further noted that, although not shown expressly in FIG. 45, the motor 3213 and pulley structure 3215 from FIG. 44 which is used to feed the electrode E can also be similarly present in the wire feeder component 4200. Again, these systems and components are generally known and need not be discussed in detail herein.

Additionally, as shown, the welding output controller 210 is also enclosed within the same housing 3201/4201 as the power conversion/wire feeding components. Again, this optimizes performance. As generally explained previously, the controller 210 controls the welding operation to ensure that the desired welding output is provided. The controller 210 can be any type computer controlled system, using digital electronic circuitry, or in computer hardware, firmware, software, or in combinations of them. The implementation can be as a computer program product, i.e., a computer program tangibly embodied in an information carrier (e.g., a CPS). An information carrier can be a machine-readable storage device or in a propagated signal, for execution by, or to control the operation of, data processing apparatus (e.g., a programmable processor, a computer, or multiple computers).

A computer program (e.g., a computer program system) can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, (e.g., magnetic, magneto-optical disks, or optical disks). Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a CNC or computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

Comprise, include, and/or plural forms of each are open ended and include the listed parts and can include additional parts that are not listed. And/or is open ended and includes one or more of the listed parts and combinations of the listed parts.

While the invention has been particularly shown and described with reference to specific illustrative embodiments, it should be understood that various changes in form and detail may be made without departing from the spirit and scope of the invention.

We claim:

1. A power supply system for an electric arc welding process, said power supply system comprising:
   a first power supply component comprising:
      an input stage having an AC input and a first fixed DC output signal;
      a second stage in the form of an unregulated DC to DC converter, unregulated by a feedback signal from the electric arc welding process, having an input connected to said first fixed DC output signal, a network of switches switched at a high frequency with a given duty cycle to convert said input into a first internal AC signal, an isolation transformer with a primary winding driven by said first internal AC signal and a secondary winding for creating a second internal AC signal; and
      a smoothing choke and a rectifier to convert said second internal AC signal into a second fixed DC output signal of said second stage with a magnitude related to said duty cycle of said switches; and
   a second power supply component mounted in a wire feeder housing and comprising:
      a power conversion module to convert said second fixed DC output signal to a welding output for welding in said process, wherein the power conversion module in the wire feeder housing is operatively connected to receive at least one of a voltage feedback signal of the welding output and a current feedback signal of the welding output at the wire feeder housing, and regulate the welding output based on the at least one of a voltage feedback signal of the welding output and a current feedback signal of the welding output, and
      a wire feeding module which controls the operation of a wire feeder mechanism within the wire feeder housing;
   wherein each of said first and second power supply component have a separate housing structure,
   wherein said second power supply component is positioned remote from said first power supply component and said second fixed DC output signal of said second stage is maintained over a set of power cables which couples said first power supply component to said second power supply component.

2. The power supply system of claim 1, wherein said set of power cables have a length in the range of 100 to 500 feet.

3. The power supply system of claim 1, wherein said input stage includes a rectifier and a power factor correcting converter.

4. The power supply system of claim 1, wherein said power conversion module includes a chopper with a power switch operated at a given frequency.

5. The power supply system of claim 4, wherein said chopper is a dual mode chopper with a first polarity path with a first power switch and a first polarity switch and a second polarity path with a second power switch and a second polarity switch, wherein the first polarity path and the second polarity path are opposite polarity paths between an electrode and a workpiece, and the dual mode chopper is selectively operable in any one of an AC mode, a DC positive mode, and a DC negative mode.

6. The power supply system of claim 5, including a controller within said second power supply component with a first mode alternately operating said chopper between first and second polarity paths and a second mode operating said chopper in only one of said polarity paths.

7. The power supply system of claim 1, wherein said power conversion module includes a circuit, located in the wire feeder housing, with a power switch to perform an STT welding process.

8. The power supply system of claim 1, wherein said wire feeding module receives power from said second fixed DC output signal.

9. A power supply system for an electric arc welding process, said power supply system comprising:
   a first module including:

an input stage having an AC input and a first fixed DC output signal;

a second stage in the form of an unregulated DC to DC converter, unregulated by a feedback signal from the electric arc welding process, having an input connected to said first fixed DC output signal, a network of switches switched at a high frequency with a given duty cycle to convert said input into a first internal high frequency AC signal, an isolation transformer with a primary winding driven by said first internal high frequency AC signal and a secondary winding for creating a second internal high frequency AC signal; and a smoothing choke and a rectifier to convert said second internal high frequency AC signal into a second fixed DC output signal of said second stage, said second stage having a fixed relationship between input and output voltages of the second stage; and a second power supply component mounted in a wire feeder housing and comprising:

a power conversion module to convert said second fixed DC output signal to a welding output for welding in said process, wherein the power conversion module in the wire feeder housing is operatively connected to receive at least one of a voltage feedback signal of the welding output and a current feedback signal of the welding output at the wire feeder housing, and regulate the welding output based on the at least one of a voltage feedback signal of the welding output and a current feedback signal of the welding output, and a wire feeding module which controls the operation of a wire feeder mechanism within the wire feeder housing;

wherein each of said first module and said second power supply component have a separate housing structure, wherein said second power supply component is positioned remote from said first module and said second fixed DC output signal of said second stage is maintained over a set of power cables which couples said first module to said second power supply component.

10. The power supply system of claim 9, wherein said set of power cables have a length in the range of 100 to 500 feet.

11. The power supply system of claim 9, wherein said input stage includes a rectifier and a power factor correcting converter.

12. The power supply system of claim 9, wherein said power conversion module includes a chopper with a power switch operated at a given frequency.

13. The power supply system of claim 12, wherein said chopper is a dual mode chopper with a first polarity path with a first power switch and a first polarity switch and a second polarity path with a second power switch and a second polarity switch, wherein the first polarity path and the second polarity path are opposite polarity paths between an electrode and a workpiece, and the dual mode chopper is selectively operable in any one of an AC mode, a DC positive mode, and a DC negative mode.

14. The power supply system of claim 13, including a controller within said second power supply component with a first mode alternately operating said chopper between first and second polarity paths and a second mode operating said chopper in only one of said polarity paths.

15. The power supply system of claim 9, wherein said power conversion module includes a circuit, located in the wire feeder housing, with a power switch to perform an STT welding process.

16. The power supply system of claim 9, wherein said given duty cycle is adjustable.

17. The power supply system of claim 9, wherein said input stage has a power factor correcting converter which is a buck+boost converter.

18. The power supply system of claim 9, wherein said wire feeding module receives power from said second fixed DC output signal.

* * * * *